(12) United States Patent
Sawada et al.

(10) Patent No.: US 12,347,088 B2
(45) Date of Patent: Jul. 1, 2025

(54) DATA PROCESSING SYSTEM

(71) Applicant: SHIMADZU CORPORATION, Kyoto (JP)

(72) Inventors: Ryuji Sawada, Kyoto (JP); Shuhei Yamamoto, Kyoto (JP); Takeshi Ono, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 436 days.

(21) Appl. No.: 17/981,948

(22) Filed: Nov. 7, 2022

(65) Prior Publication Data

US 2023/0145376 A1    May 11, 2023

(30) Foreign Application Priority Data

Nov. 9, 2021 (JP) .................... 2021-182711

(51) Int. Cl.
*G06T 7/00* (2017.01)

(52) U.S. Cl.
CPC .. *G06T 7/0002* (2013.01); *G06T 2207/30024* (2013.01)

(58) Field of Classification Search
CPC ............. G06T 7/0012; G06T 7/0002; G06T 2207/10056; G06T 2207/30024
See application file for complete search history.

(56) References Cited

U.S. PATENT DOCUMENTS

| | | | |
|---|---|---|---|
| 2005/0207633 A1* | 9/2005 | Arini | G01N 21/6452 382/133 |
| 2012/0106822 A1* | 5/2012 | Mimura | C12M 41/48 382/133 |
| 2013/0251234 A1* | 9/2013 | George | G06V 20/698 382/133 |
| 2016/0110584 A1* | 4/2016 | Remiszewski | G06V 20/69 382/133 |
| 2018/0342078 A1* | 11/2018 | Watanabe | G06V 10/255 |
| 2019/0034753 A1* | 1/2019 | Mori | G16B 45/00 |
| 2021/0272288 A1 | 9/2021 | Takahashi et al. | |
| 2022/0326140 A1* | 10/2022 | Ye | G01N 15/1429 |

FOREIGN PATENT DOCUMENTS

WO   2020/031243 A1   2/2020

* cited by examiner

*Primary Examiner* — Syed Haider
(74) *Attorney, Agent, or Firm* — Sughrue Mion, PLLC

(57) ABSTRACT

A data processing system includes a cell image processing device including an image analysis unit that analyzes the acquired cell image, a storage unit that stores relative data in which the cell image, an analysis result of the cell image, and at least one or more pieces of group division information used to perform group division on the cell image are associated with each other, and a data tree creating unit that creates a virtual data tree including result information based on the analysis result to be displayed in any hierarchy of the data tree on which group division is performed so that a plurality of the relative data belong to the same group, and an information display device including a display unit configured to display the data tree.

13 Claims, 13 Drawing Sheets

PROCESS OF SETTING GROUP DIVISION INFORMATION

PROCESS OF ANALYZING CELL IMAGE

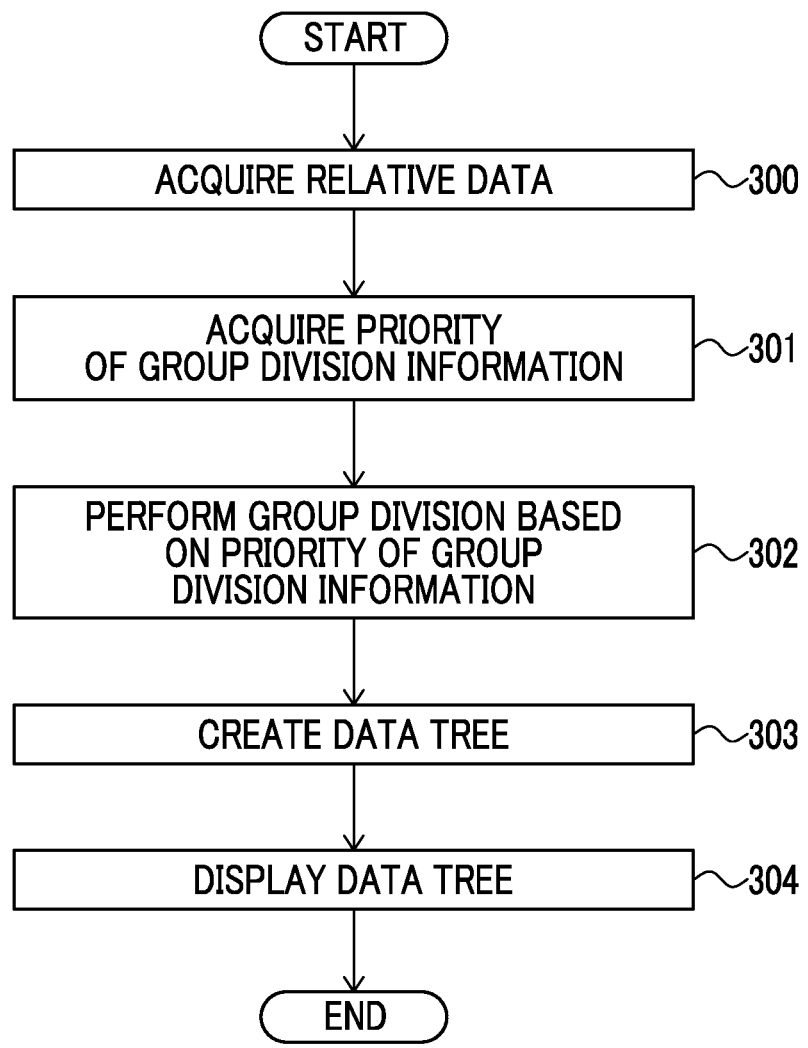

DATA PROCESSING SYSTEM

CROSS-REFERENCE TO RELATED APPLICATIONS

The priority application number JP2021-182711, Data Processing System, Nov. 9, 2021, SAWADA Ryuji, YAMAMOTO Shuhei, ONO Takeshi, upon which this patent application is based are hereby incorporated by reference.

BACKGROUND OF THE INVENTION

Field of the Invention

The present invention relates to a data processing system, and more particularly to a data processing system for analyzing a cell image.

Background Art

In the related art, a data processing system for analyzing a cell image is known. Such a data processing system for analyzing a cell image is disclosed, for example, in International Publication No. 2020/031243.

International Publication No. 2020/031243 discloses an image analysis device for analyzing an image of a cell captured by an imaging device. The image analysis device disclosed in International Publication No. 2020/031243 is configured to perform classification on the area of a cell appearing in the cell image using a trained model. Specifically, International Publication No. 2020/031243 discloses a configuration for performing classification on the cell area by a segmentation process of determining which category each pixel belongs to for each pixel of the cell image.

Here, although not disclosed in International Publication No. 2020/031243, culture of the cell is performed using a culture plate having a plurality of wells. In addition, the cell image is generally taken at a plurality of positions within each well using a microscope. Therefore, analysis of the cell image using the trained model is performed on a large number of images. Therefore, a large number of analysis results are acquired from a large number of cell images. A large number of analysis results are often managed on a computer by performing group division according to a predetermined condition and using a folder configuration with a hierarchical structure formed by a plurality of folder groups in many cases. However, when creating the folder group with the hierarchical structure, a rule for forming the hierarchical structure of the folder group depends on a user, so that it may be difficult to grasp which folder stores what analysis result. In addition, since a large number of analysis results are individually stored in each folder of the folder group with the hierarchical structure, there is an inconvenience in which it is difficult to easily confirm each individual analysis result. Therefore, there is a demand for a data processing system that enables easy management of a large number of analysis results obtained by performing group division and easy confirmation of the analysis result of the group.

SUMMARY OF THE INVENTION

The present invention is provided to solve the problems described above, and an object of the present invention is to provide a data processing system that enables easy management of a large number of analysis results obtained by performing group division and easy confirmation of the analysis result of the group.

In order to achieve the above object, according to an aspect of the present invention, there is provided a data processing system including a cell image processing device that analyzes a cell image where a cell appears; and an information display device, in which the cell image processing device includes an image analysis unit that analyzes the acquired cell image, a storage unit that stores relative data in which the cell image, an analysis result of the cell image, and at least one or more pieces of group division information used to perform group division on the cell image are associated with each other, and a data tree creating unit that creates a virtual data tree including result information based on the analysis result of a group to be displayed in any hierarchy of the data tree showing a state in which group division is performed so that a plurality of the relative data having the common group division information belong to the same group, and the information display device includes a display unit that is configured to display the data tree which is created by the data tree creating unit and displayed with the result information of the group in any hierarchy of the data tree.

Effect of the invention

As described above, the data processing system according to the aspect includes the data tree creating unit that creates the virtual data tree obtained by performing group division on the relative data. Therefore, a large number of analysis results can be managed by the data tree without creating the folder group with the hierarchical structure. In addition, as described above, the display unit that displays the data tree in which the group result information is displayed is included any hierarchy of the data tree. Therefore, the user can confirm the result information on the data tree. As a result, it is possible to provide the data processing system that enables easy management of a large number of analysis results obtained by performing group division and easy confirmation of the analysis result of the group.

BRIEF DESCRIPTION OF THE DRAWINGS

FIG. 16 is a flowchart for explaining a process of creating the data tree by the data processing system according to the embodiment.

DETAILED DESCRIPTION OF THE INVENTION

Hereinafter, an embodiment embodying the present invention will be described with reference to the drawings.

A configuration of a data processing system 100 according to one embodiment will be described with reference to FIG. 1. The data processing system 100 is a data processing system that analyzes a cell image 30.

Configuration of Data Processing System

Figure 1:
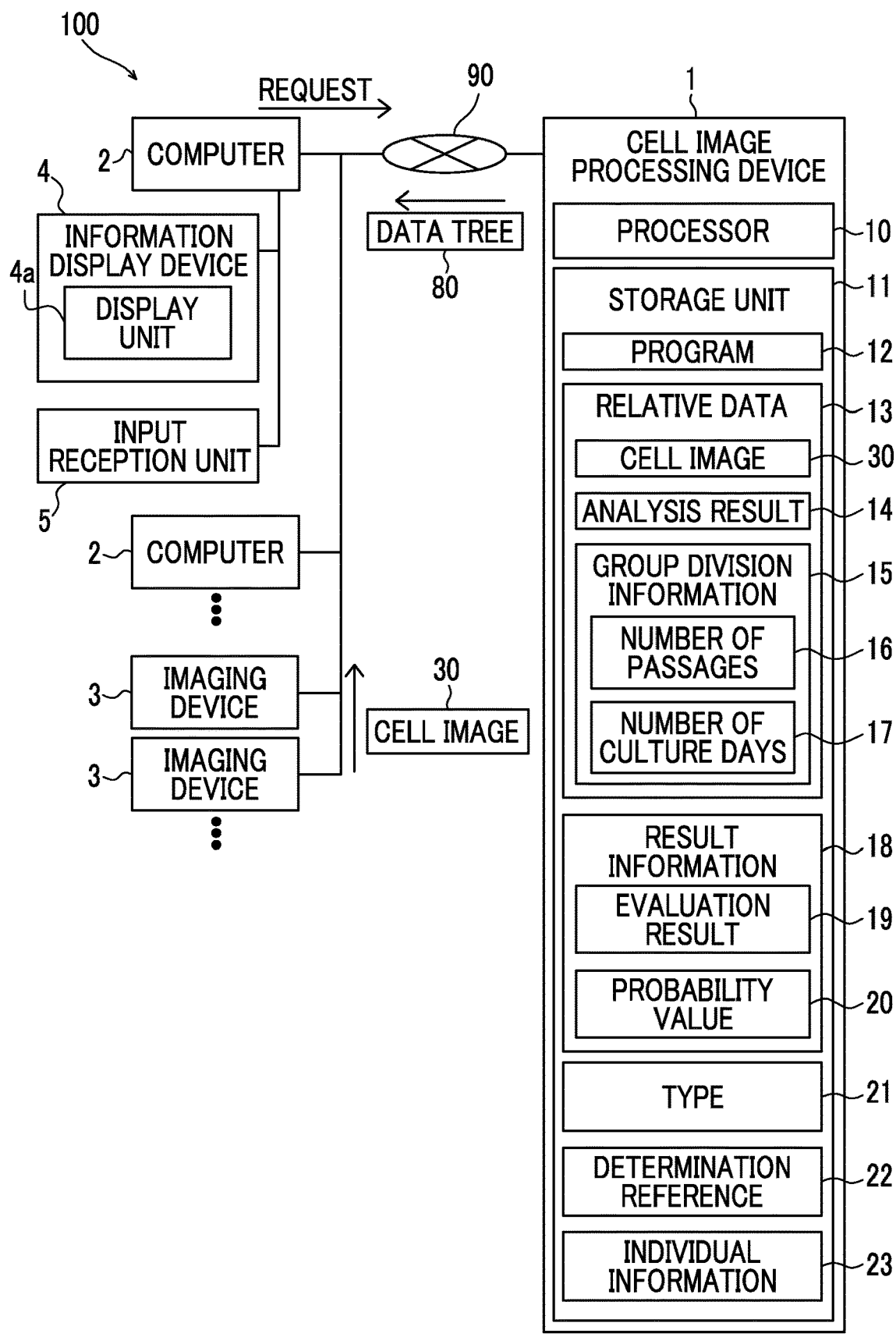
FIG. 1 is a schematic diagram showing an overall configuration of a data processing system according to an embodiment.

The data processing system 100 includes a cell image processing device 1, a computer 2, and an imaging device 3, as shown in FIG. 1.

FIG. 1 shows an example of the data processing system 100 constructed in a client-server model. The computer 2 functions as a client terminal in the data processing system 100. The cell image processing device 1 functions as a server in the data processing system 100. The cell image processing device 1, the computer 2, and the imaging device 3 are connected via a network 90 so as to be able to communicate with each other. The cell image processing device 1 performs various types of information processing in response to a request (processing request) from the computer 2 operated by a user. The cell image processing device 1 analyzes the cell image 30 in response to the request. For example, the cell image processing device 1 analyzes whether a cell appearing in the cell image 30 is differentiated or remains undifferentiated.

In addition, the cell image processing device 1 also creates a data tree 80 that displays a cell analysis result 14 in response to the request. In addition, the cell image processing device 1 also transmits the created data tree 80 to the computer 2. The data tree 80 is displayed on the display unit 4a of the information display device 4 connected to the computer 2. The data tree 80 is a virtual data tree showing a state in which group division is performed so that a plurality of relative data 13 having common group division information 15, which will be described later, belong to the same group.

The network 90 connects the cell image processing device 1, the computer 2, and the imaging device 3 so as to be able to communicate with each other. The network 90 can be, for example, a Local Area Network (LAN) constructed within a facility. The network 90 may be, for example, the Internet. When the network 90 is the Internet, the data processing system 100 may be a system built in the form of cloud computing.

The computer 2 is a so-called personal computer and includes a processor and a storage unit. The information display device 4 and an input reception unit 5 are connected to the computer 2. The information display device 4 includes the display unit 4a. The display unit 4a displays the data tree 80. The display unit 4a is, for example, a liquid crystal display device. The display unit 4a may be an electroluminescence display device, a projector, or a head-mounted display. The input reception unit 5 is an input device including, for example, a mouse and a keyboard. The input reception unit 5 may be a touch panel. One or more computers 2 are provided in the data processing system 100.

The imaging device 3 generates the cell image 30 by imaging the cell. The imaging device 3 can transmit the generated cell image 30 to the computer 2 and/or the cell image processing device 1 via the network 90. The imaging device 3 captures a microscopic image of the cell. The imaging device 3 performs imaging by an imaging method such as a bright field observation method, a dark field observation method, a phase contrast observation method, or a differential interference observation method. One or more types of imaging devices 3 are used according to the imaging method. The data processing system 100 may be provided with one or more imaging devices 3.

The cell image processing device 1 includes a processor 10 and a storage unit 11.

The processor 10 is configured to analyze the acquired cell image 30. In addition, the processor 10 is also configured to create the data tree 80. The processor 10 includes a Central Processing Unit (CPU), a Read Only Memory (ROM), a Random Access Memory (RAM), a Graphics Processing Unit (GPU), or a Field-Programmable Gate Array (FPGA) configured for image processing.

The storage unit 11 stores various programs 12 executed by the processor 10. In addition, the storage unit 11 is also configured to store the relative data 13, the group division information 15, the result information 18, a type 21, a determination reference 22, and individual information 23, which will be described later. The storage unit 11 includes, for example, a non-volatile storage device such as a Hard Disk Drive (HDD) or a Solid State Drive (SSD).

The relative data 13 is data obtained by associating the cell image 30, the analysis result 14, and the group division information 15. The relative data 13 is a conceptual data structure representing a state with which the cell image 30, the analysis result 14, and the group division information 15 are associated.

The group division information 15 is accompanying information such as information when culturing the cell and information acquired when capturing the cell image 30. The details of the group division information 15 will be described later.

The group result information 18 is information indicating the analysis result for each group acquired based on the plurality of analysis results 14. In the present embodiment, the group result information 18 includes, for example, an evaluation result 19 and a probability value 20. The evaluation result 19 is information obtained by determining the type 21 based on the type 21 and the reference which are predetermined by the user. The details of the group result information 18 will be described later.

The type 21 is information indicating classification when the cell image 30 is analyzed. In the present embodiment, the type 21 is, for example, information as to whether the cell is differentiated or remains undifferentiated.

The determination reference 22 is reference for determining which type 21 the analysis result 14 belongs to. In other words, the determination reference 22 is a threshold for determining which type 21 the analysis result 14 is based on the probability value 20.

The individual information 23 is information that is capable of specifying the analysis result 14 to be displayed together with the evaluation result 19. The details of the individual information 23 will be described later.

Data Tree and Group Division Information

Next, the data tree 80 and the group division information 15 will be described with reference to FIG. 2. The data tree 80 is displayed in the first display area 4b of the display unit 4a. In addition, a setting field 4c for the group division information 15 is displayed on the display unit 4a.

The group division information 15 includes information such as a culture condition when the cell is cultured and a microscope when the cell image 30 is captured. The group division information 15 is, for example, information including at least one of the number of passages 16 of the cell and the number of culture days 17 of the cell. In the present embodiment, the group division information 15 includes both the number of passages 16 of the cell and the number of culture days 17 of the cell. In the example shown in FIG. 2, the group division information 15 further includes a microscope type 15a that captures the cell image 30, and a culture vessel well 15b in which the cell is cultured.

In the setting field 4c for the group division information 15, the group division information 15 arranged in order of priority is displayed. In the example shown in FIG. 2, the priority is in order of the microscope type 15a, the number of passages 16, the culture vessel well 15b, and the number of culture days 17.

The user can change the priority by operating the group division information 15 displayed in the setting field 4c for the group division information 15. The details of the configuration for changing the priority of the group division information 15 will be described later.

The data tree 80 is a virtual data tree obtained by performing group division on the relative data 13 (see FIG. 1) based on the group division information 15. Specifically, the data tree 80 is a data tree in which the analysis result 14, the evaluation result 19, and the probability value 20 are hierarchically classified based on the group division information 15.

Figure 2:
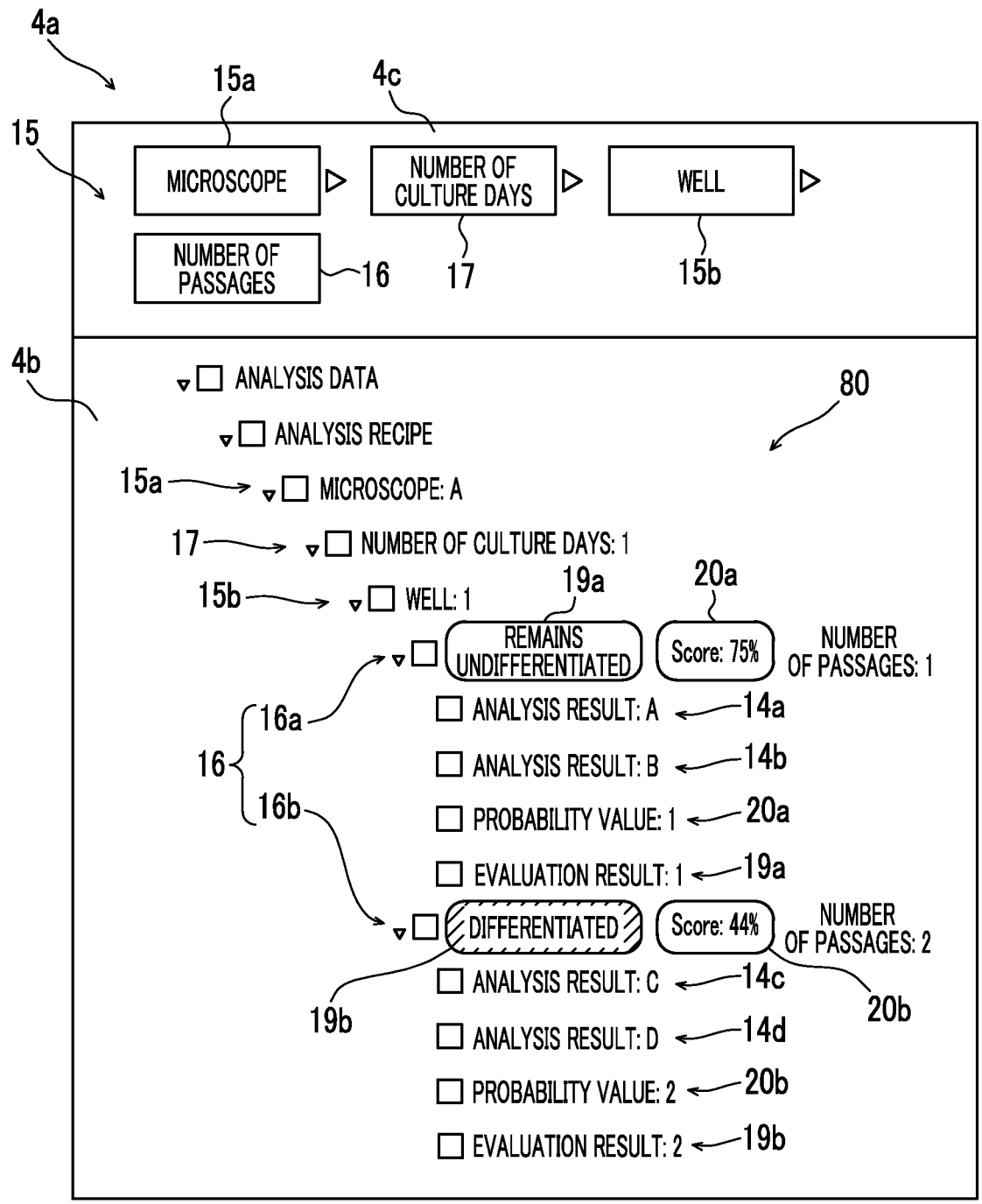
FIG. 2 is a schematic diagram for explaining a data tree and a setting field for group division information displayed by the data processing system according to the embodiment.

In the example shown in FIG. 2, the data tree 80 is a data tree in which the relative data 13 are hierarchically classified in the order of the microscope type 15a, the number of culture days 17, the culture vessel well 15b, and the number of passages 16. Then, in the hierarchy under the hierarchy of the number of passages 16, each analysis result 14 (analysis results 14a to 14c), each probability value 20 (probability value 20a and probability value 20b) and each evaluation result 19 (evaluation results 19a and 19b) are displayed.

In addition, in the example shown in FIG. 2, in the hierarchy of the number of passages 16 in the data tree 80, the evaluation result 19 and the probability value 20 are displayed as icons. The details of the configuration for creating the data tree 80 will be described later.

Analysis Result and Result Information

Figure 3:
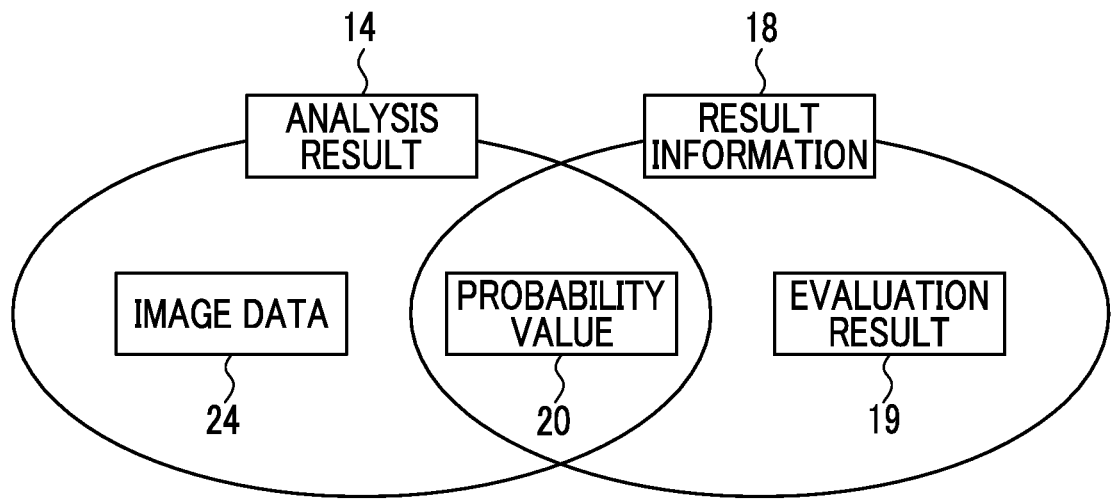
FIG. 3 is a block diagram for explaining an analysis result and result information.

Next, the analysis result 14 and result information 18 will be described with reference to FIG. 3.

The analysis result 14 is information output by an image analysis unit 10a. Specifically, the analysis result 14 is information output by a learning model selected by an analysis recipe which will be described later. The analysis result 14 include, for example, image data 24 and a probability value 20.

The group result information 18 is information based on the group analysis result 14 to be displayed in any hierarchy of the data tree 80 (see FIG. 1). The group result information 18 includes the evaluation result 19 based on analysis result 14 included in the group. In addition, the result information 18 also includes analytical numerical data, which is numerical data related to the evaluation result 19. In the present embodiment, the analytical numerical data includes a probability value 20 indicating which type 21 (see FIG. 1) the analysis result 14 is. As shown in FIG. 3, the probability value 20 is the analysis result 14 and the result information 18.

Each Functional Block of Processor

Figure 4:
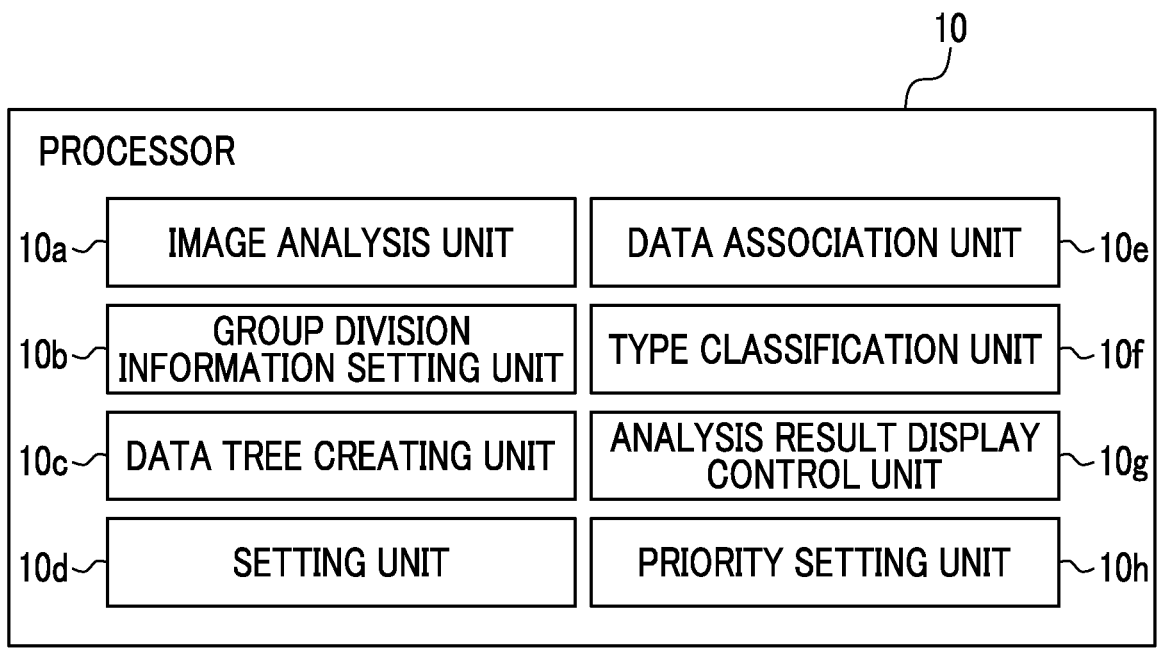
FIG. 4 is a diagram for explaining functional blocks of a processor included in the data processing system.

Functional blocks included in the processor 10 will be described with reference to FIG. 4. The processor 10 including the CPU as hardware includes, as functional blocks of software (program), an image analysis unit 10a, a group division information setting unit 10b, a data tree creating unit 10c, a setting unit 10d, a data association unit 10e, a type classification unit 10f, an analysis result display control unit 10g, and a priority setting unit 10h. By executing the program 12 stored in the storage unit 11, the processor 10 functions as the image analysis unit 10a, the group division information setting unit 10b, the data tree creating unit 10c, the setting unit 10d, the data association unit 10e, the type classification unit 10f, the analysis result display control unit 10g, and the priority setting unit 10h. The image analysis unit 10a, the group division information setting unit 10b, the data tree creating unit 10c, the setting unit 10d, the data association unit 10e, the type classification unit 10f, the analysis result display control unit 10g, and the priority setting unit 10h may be provided with a dedicated processor (processing circuit) and configured individually by hardware.

The image analysis unit 10a is configured to analyze the acquired cell image 30 (see FIG. 1). Specifically, the image analysis unit 10a is configured to output the analysis result 14 and the probability value 20 by analyzing the cell image 30. In the present embodiment, the image analysis unit 10a analyzes the cell image 30 using a learning model that has learned to analyze the cell image 30. In addition, in the present embodiment, the image analysis unit 10a is configured to analyze whether the cell appearing in the cell image 30 is differentiated or remains undifferentiated.

The group division information setting unit 10b is configured to set the group division information 15 (see FIG. 1). In the present embodiment, the group division information setting unit 10b is configured to store the set group division information 15 in the storage unit 11. The details of the configuration in which the group division information setting unit 10b sets the group division information 15 will be described later.

The data tree creating unit 10c is configured to create the data tree 80 (see FIG. 1). Specifically, the data tree creating unit 10c creates the data tree 80 having a hierarchical structure based on the group division information 15. In the present embodiment, the data tree creating unit 10c is configured to create the data tree 80 including the evaluation result 19 (see FIG. 1) to be displayed together with the group division information 15 in at least any hierarchy of the data tree 80. The details of the configuration in which the data tree creating unit 10c creates the data tree 80 will be described later.

The setting unit 10d is configured to set the type 21 (see FIG. 1) and the determination reference 22 (see FIG. 1). Specifically, the setting unit 10d is configured to set the type 21 and the determination reference 22 based on an operation input which is input via the input reception unit 5 (see FIG. 1). The setting unit 10d is configured to store the type 21 and the determination reference 22 in the storage unit 11 (see FIG. 1).

The data association unit 10e is configured to generate the relative data 13. Specifically, the data association unit 10e associates the cell image 30, the analysis result 14, and the group division information 15 to generate the relative data 13 which is a conceptual data structure. In addition, the data association unit 10e stores the generated relative data 13 in the storage unit 11.

The type classification unit 10f is configured to classify which type 21 the analysis result 14 is based on the determination reference 22. Specifically, the type classification unit 10f classifies which type 21 the analysis result 14 is by comparing the probability value 20 with the determination reference 22. That is, the type classification unit 10f compares the probability value 20 and the determination reference 22 to output the evaluation result 19 which is information determining which type 21 the analysis result 14 belongs to. In the present embodiment, the type classification unit 10f is configured to classify, for example, whether the cell appearing in the cell image 30 (see FIG. 1) is differentiated or remains undifferentiated. Specifically, when the probability value 20 exceeds the determination reference 22, the type classification unit 10f determines that the cell remains undifferentiated, and outputs the evaluation result 19 (evaluation result 19a (see FIG. 8)) indicating that the cell remains undifferentiated. In addition, when the probability value 20 is less than the reference 22, the type classification unit 10f determines that the cell is differentiated, and outputs the evaluation result 19 (evaluation result 19b (see FIG. 8) indicating that the cell is differentiated.

When either the evaluation result 19 or the individual information 23 (see FIG. 1) displayed in the data tree 80 is selected, the analysis result display control unit 10g is configured to perform control to display the corresponding analysis result 14 (see FIG. 1) on the display unit 4a (see FIG. 1). The details of control to display the analysis result 14 on the display unit 4a by the analysis result display control unit 10g will be described later.

The priority setting unit 10h is configured to set the priority of the group division information 15 (see FIG. 1). Specifically, the priority setting unit 10h sets the priority of the group division information 15 based on the user's operation input via the input reception unit 5. In addition, the priority setting unit 10h stores the set priority in the storage unit 11.

Setting of Group Division Information

Next, a configuration for setting the group division information 15 (see FIG. 1) by the group division information setting unit 10b (see FIG. 4) will be described with reference to FIGS. 5 and 6.

Figures 5, 6:
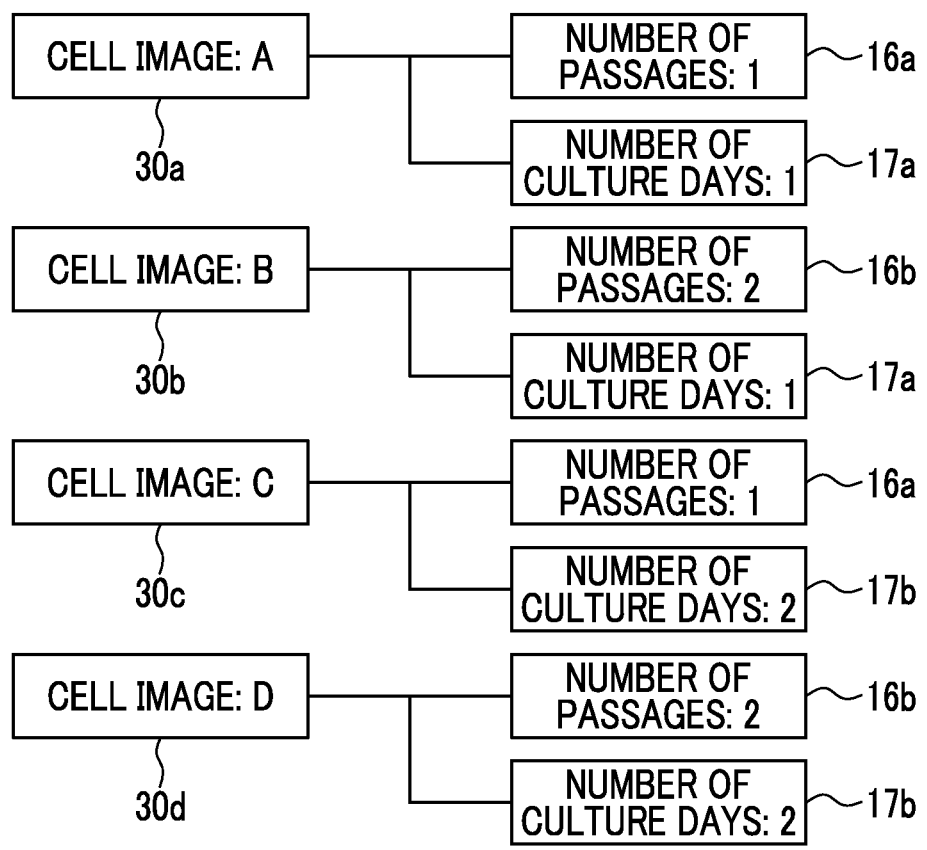
FIG. 5 is a schematic diagram for explaining a screen for registering the group division information in the data processing system according to the embodiment.
FIG. 6 is a schematic diagram for explaining the analysis result associated with the group division information.

The example shown in FIG. 5 is a setting screen 40 for setting the group division information 15. The setting screen 40 for the group division information 15 is displayed on the display unit 4a (see FIG. 1). The setting screen 40 for the group division information 15 displays an input field 40a, an input field 40b, a registration data selection field 40c, a registration button 40d, and a cancel button 40e.

The input field 40a is an input field in which the number of passages 16 (see FIG. 1) is input by the user.

The input field 40b is an input field in which the user inputs the number of culture days 17 (see FIG. 1).

The registration data selection field 40c is a selection field for selecting the cell image 30 (see FIG. 1) with which the group division information 15 is associated.

The registration button 40d is a push button on a Graphical User Interface (GUI) displayed on the setting screen 40. When the registration button 40d is pressed, the group division information setting unit 10b stores the relative data 13, in which the selected cell image 30 is associated with the number of passages 16 and the number of culture days 17, in the storage unit 11 (see FIG. 1).

The cancel button 40e is a push button on the GUI displayed on the setting screen 40. When the cancel button 40e is pressed, the setting screen 40 is closed without storing the relative data 13 in the storage unit 11.

FIG. 6 shows a state in which group division information 15 is associated with cell images 30. Specifically, FIG. 6 is an example of a state in which the number of passages 16 and the number of culture days 17 are associated with the cell image 30.

In the example shown in FIG. 6, the corresponding number of passages 16 and the number of culture days 17 are associated with four cell images 30 including cell images 30a to 30d.

Specifically, the group division information setting unit 10b (see FIG. 4) associates the number of passages 16a and the number of culture days 17a with the cell image 30a. The number of passages 16a is the number of passages 16 indicating that the number of passages of the cell is "1". In addition, the number of culture days 17a is the number of culture days 17 indicating that the number of days the cell is cultured is "1 day".

In addition, the group division information setting unit 10b associates the number of passages 16b and the number of culture days 17a with the cell image 30b. The number of passages 16b is the number of passages 16 indicating that the number of passages of the cell is "2".

In addition, the group division information setting unit 10b associates the number of passages 16a and the number of culture days 17b with the cell image 30c. The number of culture days 17b is the number of culture days 17 indicating that the number of days the cell is cultured is "2 days".

In addition, the group division information setting unit 10b associates the number of passages 16b and the number of culture days 17b with the cell image 30d. The group division information setting unit 10b stores each cell image 30 in the storage unit 11 (see FIG. 1) in a state in which the corresponding number of passages 16 and the number of culture days 17 are associated with each cell image 30.

Analysis of Cell Image

Next, referring to FIGS. 7 and 8, an example of a screen for selecting an analysis recipe when the image analysis unit 10a (see FIG. 4) analyzes the cell image 30 (see FIG. 1), and a configuration in which the analysis result 14 (see FIG. 1), the evaluation result 19 (see FIG. 1), and the probability value 20 (see FIG. 1) are associated with the cell image 30 will be described.

Figure 7:
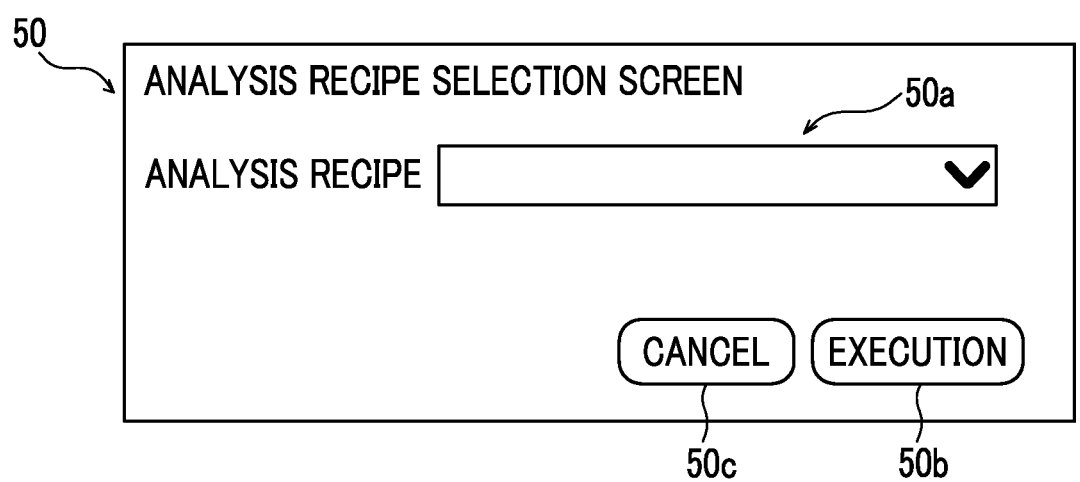
FIG. 7 is a schematic diagram for explaining an analysis screen when analyzing a cell image in the data processing system according to the embodiment.

FIG. 7 is an example of an analysis recipe selection screen 50 displayed on the display unit 4a (see FIG. 1) when the cell image 30 is analyzed. In the analysis recipe selection screen 50, an analysis recipe selection field 50a, an execution button 50b, and a cancel button 50c are displayed.

The analysis recipe selection field 50a is a selection field for selecting a recipe when analyzing the cell image 30. The analysis recipe selection field 50a is, for example, a pull-down selection field. In addition, the analysis recipe also includes the learning model used to analyze the cell image 30, a program of preprocessing performed on the cell image 30, and the like.

The execution button 50b is a push button on the GUI displayed in the analysis recipe selection screen 50. When the execution button 50b is pressed, the image analysis unit 10a analyzes the cell image 30 using the analysis recipe selected in the analysis recipe selection field 50a.

The cancel button 50c is a push button on the GUI displayed in the analysis recipe selection screen 50. When the cancel button 50c is pressed, the analysis recipe selection screen 50 is closed while the image analysis unit 10a does not analyze the cell image 30.

Figure 8:
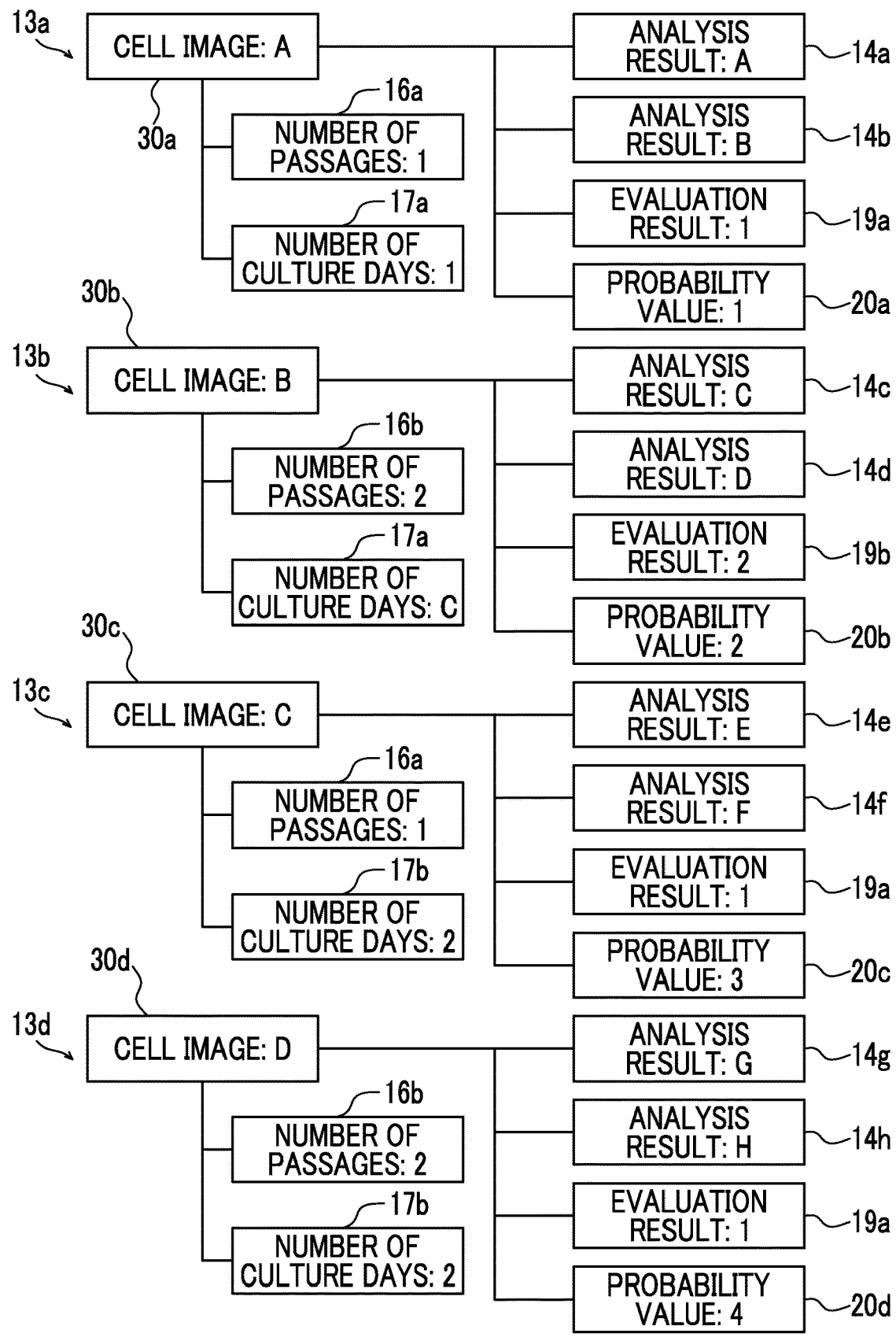
FIG. 8 is a schematic diagram for explaining association between the cell image and the analysis result.

FIG. 8 is an example of the relative data 13. The relative data 13 is data in which the cell image 30, the analysis result 14 of the cell image 30, and at least one or more pieces of group division information 15 used for group division performed on the cell image 30 are associated. The example shown in FIG. 8 represents an example of a state in which the number of passages 16, the number of culture days 17, the analysis result 14, the evaluation result 19, and the probability value 20 are associated with the cell image 30.

In the example shown in FIG. 8, the four cell images 30 including the cell images 30a to 30d are analyzed, and the corresponding analysis result 14, the evaluation result 19, and the probability value 20 are associated with each of the cell images 30. The analysis result 14 and the probability value 20 are output by the image analysis unit 10a (see FIG. 4) and stored in the storage unit 11 (see FIG. 1). In addition, the evaluation result 19 is output by the type classification unit 10f (see FIG. 4) and stored in the storage unit 11. The data association unit 10e (see FIG. 4) acquires the analysis result 14, the evaluation result 19, and the probability value 20 from the storage unit 11, and associates the analysis result 14, the evaluation result 19, and the probability value 20 with the cell image 30.

Specifically, the data association unit 10e generates relative data 13a in which the analysis result 14a, the analysis result 14b, the evaluation result 19a, and the probability value 20a are associated with the cell image 30a. In addition, the data association unit 10e associates the analysis result 14c, the analysis result 14d, the evaluation result 19b, and the probability value 20b with the cell image 30b to generate relative data 13b. In addition, the data association unit 10e associates an analysis result 14e, an analysis result 14f, an evaluation result 19a, and a probability value 20c with the cell image 30c to generate relative data 13c. In addition, the data association unit 10e associates an analysis result 14g, an analysis result 14h, an evaluation result 19a, and a probability value 20d with the cell image 30d. The data association unit 10e stores each cell image 30 in the storage unit 11 in a state in which the corresponding analysis result 14, the evaluation result 19, and the probability value 20 are associated with each cell image 30.

Creation of Data Tree

Next, a configuration in which the data tree creating unit 10c (see FIG. 4) creates the data tree 80 will be described with reference to FIGS. 9 to 12. Examples of FIGS. 9 to 12 are described based on the data tree 80 (data tree 81 (see FIG. 11)) obtained by performing group division using the number of passages 16 and the number of culture days 17, and a data tree 82 (see FIG. 12) obtained by performing group division using the number of passages 16.

In the present embodiment, the data tree creating unit 10c is configured to create the data tree 80 including the result information 18 based on the analysis result 14 of a group to be displayed in any hierarchy of the data tree 80.

The data tree creating unit 10c performs group division based on the group division information 15 (see FIG. 1). In the present embodiment, for example, the data tree creating unit 10c performs group division according to the priority of the group division information 15. In the example shown in FIG. 9, the priority of the group division information 15 is in the order of the number of culture days 17 and the number of passages 16. Therefore, the data tree creating unit 10c performs group division on the analysis result 14 by the number of passages 16 after performing group division on the analysis result 14 by the number of culture days 17.

Specifically, the data tree creating unit 10c performs group division on the relative data 13 (see FIG. 1) so that the number of culture days 17 is divided into a group of 1 day (group of the number of culture days 17a) and a group of 2 days (group of the number of culture days 17b). In the example shown in FIG. 9, the data tree creating unit 10c performs group division on the relative data 13 so that the number of culture days 17 is divided into the group of 1 day and the group of 2 days. However, actually, the data tree creating unit 10c performs group division on the relative data 13 as many as the number of culture days 17 which is set as the group division information 15. For example, when the number of culture days 17 is set to 1 to 4 days, the data tree creating unit 10c performs group division on the relative data 13 so that the number of culture days 17 is divided into respective groups of 1 to 4 days.

Next, the data tree creating unit 10c performs group division according to the number of passages 16 on the groups of the number of culture days 17a. That is, the data tree creating unit 10c performs group division on the relative data 13 so that the number of passages 16 is divided into a group of 1 (group of the number of passages 16a) and a group of 2 (group of the number of passages 16b) in the group in which the number of culture days 17 is 1 day. In the example shown in FIG. 9, the data tree creating unit 10c performs group division on the relative data 13 so that the number of passages 16 is divided into groups of 1 and 2. However, actually, the data tree creating unit 10c performs group division on the relative data 13 as many as the number of passages 16 which is set as the group division information 15. For example, when the number of passages 16 is set to 1 to 4, the data tree creating unit 10c performs group division on the relative data 13 so that the number of passages 16 is divided into respective groups of 1 to 4. The data tree creating unit 10c performs group division according to the number of passages 16 even in the group of the number of culture days 17b. Therefore, the data tree creating unit 10c creates the data tree 80 shown in FIG. 9.

Figure 9:
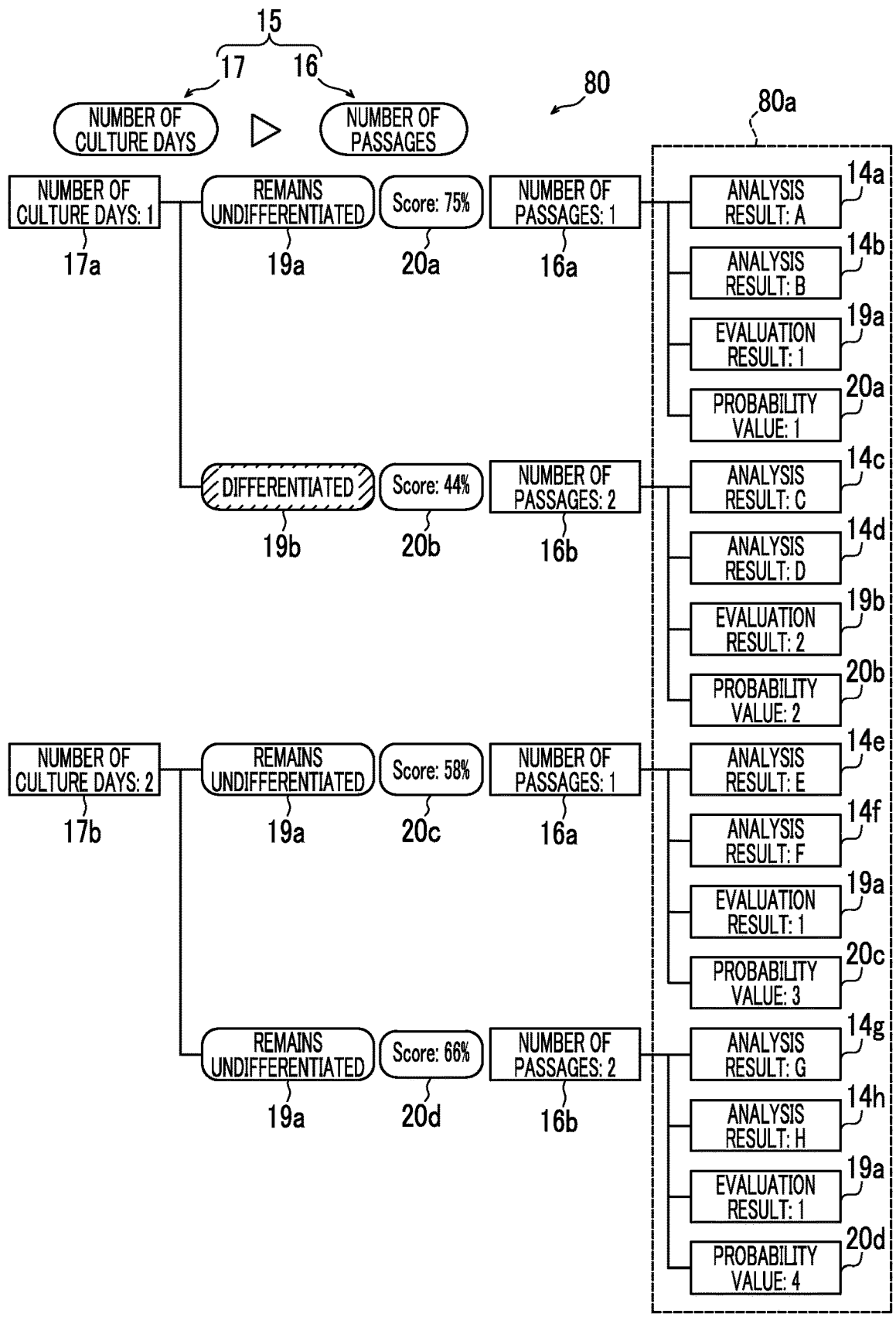
FIG. 9 is a schematic diagram for explaining a data tree created by a data tree creating unit according to the embodiment.

Therefore, as shown in FIG. 9, the group of the number of culture days 17a and the number of passages 16a in the data tree 80 includes the analysis result 14a, the analysis result 14b, the evaluation results 19a, and the probability value 20a. In addition, the group of the number of culture days 17a and the number of passages 16b in the data tree 80 includes the analysis result 14c, the analysis result 14d, the evaluation results 19b, and the probability value 20b. In addition, the group of the number of culture days 17b and the number of passages 16a in the data tree 80 includes the analysis result 14e, the analysis result 14f, the evaluation result 19a, and the probability values 20c. In addition, the group of the number of culture days 17b and the number of passages 16b in the data tree 80 includes analysis result 14g, the analysis result 14h, the evaluation result 19a, and the probability value 20d.

In the example shown in FIG. 9, the data tree creating unit 10c is configured to create the data tree 80 including analytical numerical data (probability value 20) to be displayed together with the evaluation result 19 in a hierarchy one level above the lowest layer 80a of the data tree 80. Specifically, the data tree creating unit 10c creates the data tree 80 in which the icon of the evaluation result 19 and the icon of the probability value 20 are displayed at the beginning part of the hierarchy of the number of passages 16.

In the example shown in FIG. 9, the data tree creating unit 10c creates the data tree 80 in which the icon of the evaluation result 19a and the icon of the probability value 20a are displayed at the beginning part of the hierarchy of the number of passages 16 among the hierarchies under the number of culture days 17a. In addition, the data tree creating unit 10c creates the data tree 80 in which the icon of the evaluation result 19b and the icon of the probability value 20b are displayed at the beginning part of the hierarchy of the number of passages 16b among the hierarchies under the number of culture days 17a.

In addition, the data tree creating unit 10c creates the data tree 80 in which the icon of the evaluation result 19a and the icon of the probability value 20c are displayed at the beginning part of the hierarchy of the number of passages 16 among the hierarchies under the number of culture days 17b. In addition, the data tree creating unit 10c creates the data tree 80 in which the icon of the evaluation result 19a and the icon of the probability value 20d are displayed at the beginning part of the hierarchy of the number of passages 16b among the hierarchies under the number of culture days 17a.

The example shown in FIG. 9 shows a state in which the lowest layer 80a of the data tree 80 is displayed. However, actually, when the data tree 80 is displayed, the lowest layer 80a of the data tree 80 is not displayed, and becomes a display state by an operation input of the user.

In addition, the data tree creating unit 10c creates the data tree 80 in which the display mode of the evaluation result 19 is changed based on the type 21 (see FIG. 1) of the evaluation result 19 in the hierarchy one level above the lowest layer 80a of the data tree 80. Specifically, the data tree creating unit 10c changes the display mode between when the type 21 is differentiated and when the type 21 remains undifferentiated. The data tree creating unit 10c changes the display mode of the evaluation result 19 by, for example, changing the background color of the evaluation result 19. In the example shown in FIG. 9, the background color of the evaluation result 19a when remaining undifferentiated is displayed in green, and the background color of the evaluation result 19b when being differentiated is displayed in red. In FIG. 9, the evaluation result 19a is not hatched and the evaluation result 19b is hatched to show that the display modes are different.

The display unit 4a (see FIG. 1) is configured to display the data tree 80 created by the data tree creating unit 10c and transmitted to the information display device 4. In the present embodiment, the display unit 4a is configured to display the data tree 80 created by the data tree creating unit 10c and displaying the group result information 18 in any of the hierarchies of the data tree 80. In the present embodiment, the display unit 4a is configured to display the data tree 80 in which the evaluation result 19 is displayed together with the group division information 15 in at least any hierarchy of the data tree 80. Specifically, the display unit 4a is configured to display the data tree 80 in which the analytical numerical data (probability value 20) is displayed together with the evaluation result 19 in the hierarchy one level above the lowest layer 80a of the data tree 80.

Lowest Layer of Data Tree

Figure 10:
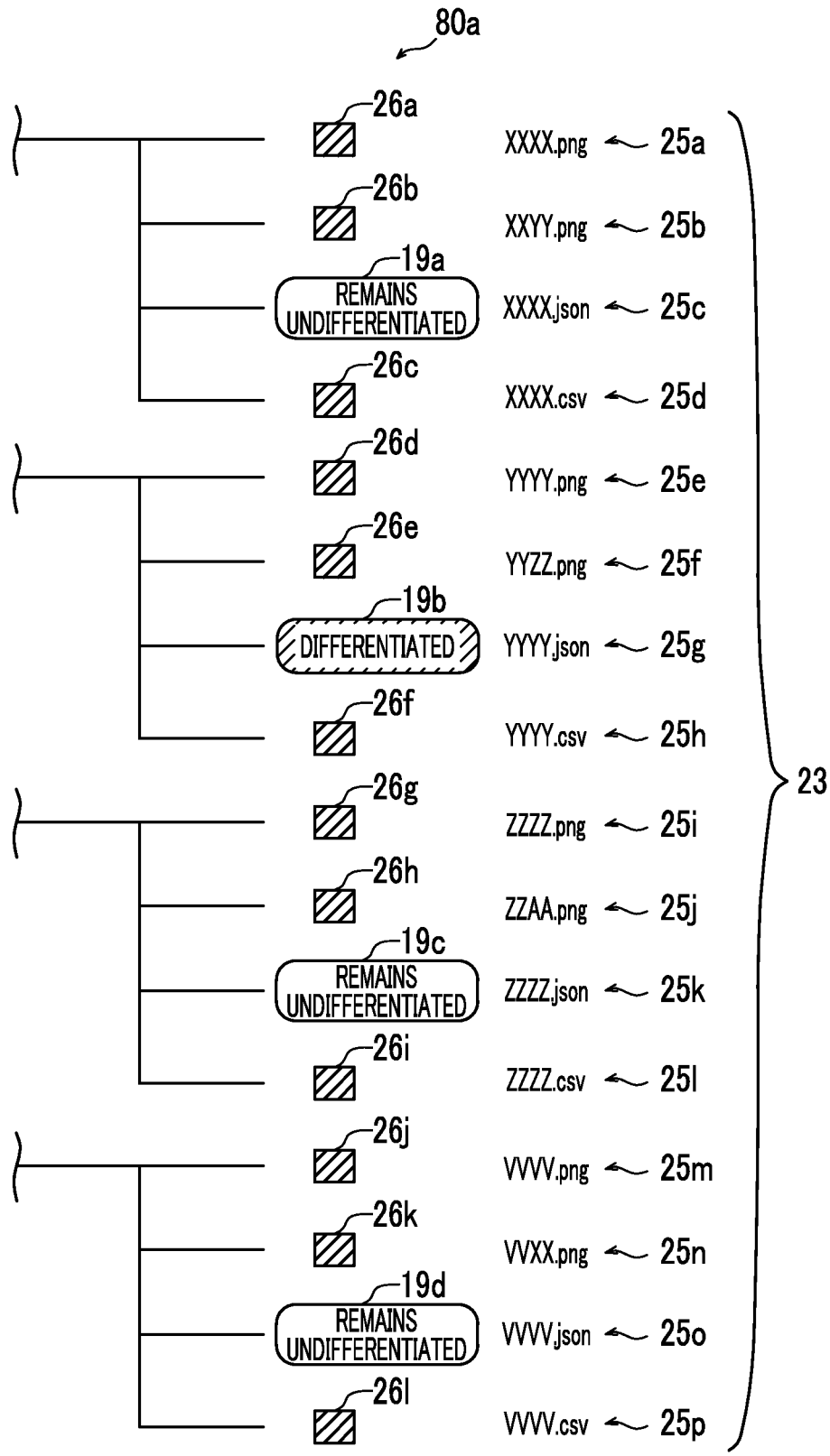
FIG. 10 is a schematic diagram for explaining the lowest layer of the data tree.

Next, the lowest layer 80a of the data tree 80 will be described with reference to FIG. 10. As shown in FIG. 10, the data tree creating unit 10c is configured to create a data tree 80 including individual information 23 to be displayed together with the evaluation result 19 in the lowest layer 80a of the data tree 80. The individual information 23 includes, for example, the file name 25 of the file of each of the analysis result 14, the evaluation result 19, and the probability value 20. An example shown in FIG. 10 shows file names 25a to 25p at corresponding positions of the analysis result 14, the evaluation result 19, and the probability value 20 which are shown in FIG. 9.

The analysis result 14 includes the image data 24 (see FIG. 3) and the numerical data (probability value 20). Among the file names 25, a file with the extension "png" is an image file of the analysis result 14. The image file of the analysis result 14 includes, for example, a superimposed cell image in which labels are superimposed on the cell area of the cell image 30, a histogram image created based on the probability values 20, and the like. In addition, among the file names 25, a file with the extension "json" is the numerical data file of the evaluation result 19. In addition, among the file names 25, a file with the extension "csv" is the file of the probability value 20.

The data tree creating unit 10c creates the data tree 80 in which the evaluation result 19 is displayed at a position before the file name 25 of the evaluation result 19. In the example shown in FIG. 10, the data tree creating unit 10c changes the display mode of the evaluation result 19 according to the type 21 (see FIG. 1).

Before the file name 25 of the analysis result 14 and before the file name 25 of the probability value 20, file icons 26 (icons 26a to 26l) are displayed. The file icon 26 includes, for example, the thumbnail image of the file.

The display unit 4a (see FIG. 1) is configured to display the data tree 80 in which the individual information 23 is displayed together with the evaluation result 19 in the lowest layer 80a of the data tree 80.

Change of Priority of Group Division Information

Next, the data tree 81 when the priority of the group division information 15 is changed by the priority setting unit 10h will be described with reference to FIG. 11.

Figure 11:
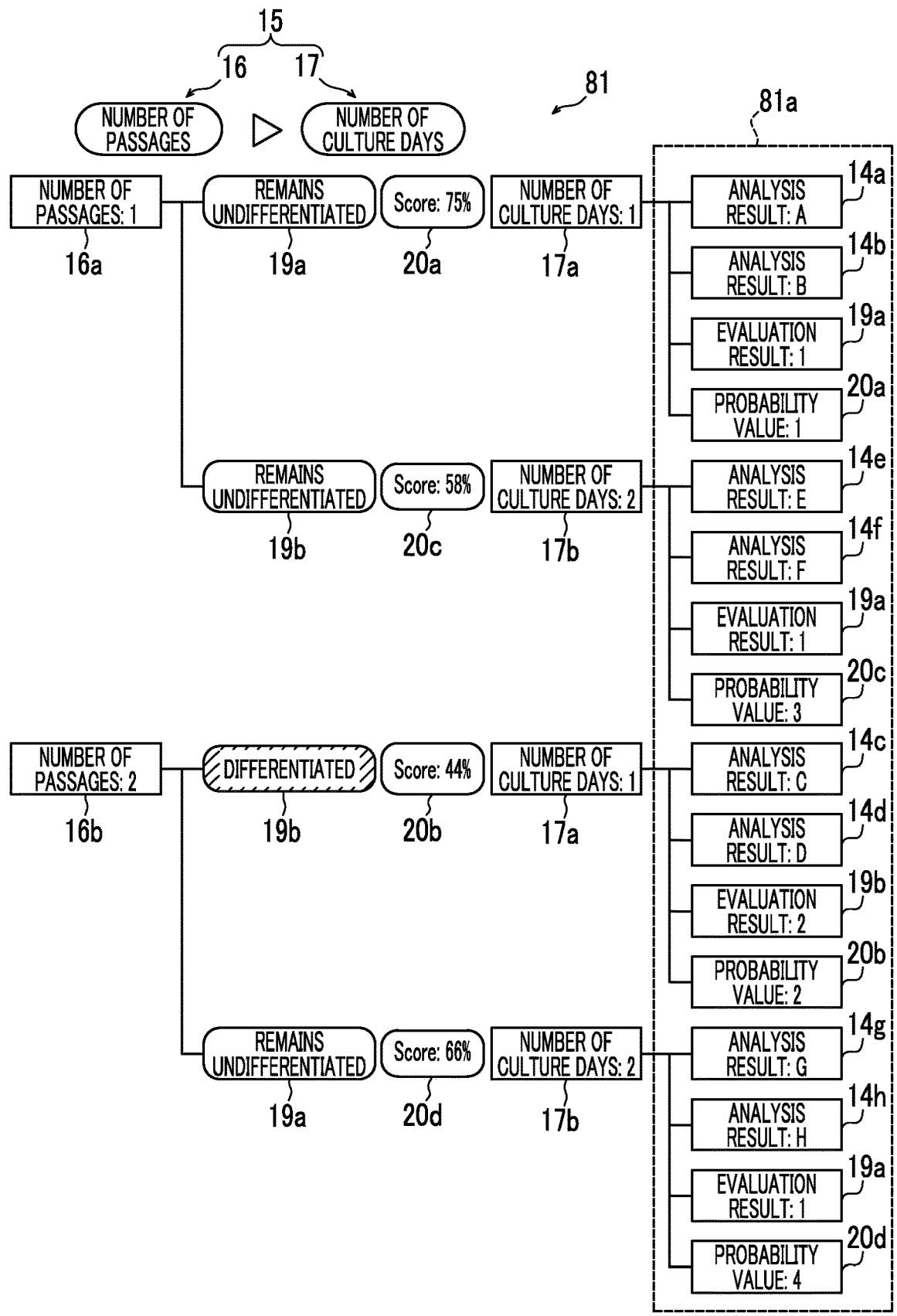
FIG. 11 is a schematic diagram for explaining the data tree when the priority of the group division information is changed.

As shown in FIG. 11, when the setting of the priority of the group division information 15 is changed, the data tree creating unit 10c is configured to recreate the data tree 81 based on the changed priority of the group division information 15. An example shown in FIG. 11 shows the data tree 81 when the priority of the group division information 15 is changed from the order of the number of culture days 17 and the number of passages 16 to the order of the number of passages 16 and the number of culture days 17. Therefore, the data tree creating unit 10c performs group division on the relative data 13 (see FIG. 1) according to the number of passages 16, and then performs group division according to the number of culture days 17 on each group of the number of passages 16.

Therefore, as shown in FIG. 11, the group of the number of passages 16a and the number of culture days 17a in the data tree 81 includes the analysis result 14a, the analysis result 14b, the evaluation result 19a, and the probability value 20a. In addition, the group of the number of passages 16a and the number of culture days 17b in data tree 81 includes the analysis result 14e, the analysis result 14f, the evaluation result 19a, and the probability value 20c. In addition, the group of the number of passages 16b and the number of culture days 17a in the data tree 81 includes the analysis result 14c, the analysis result 14d, the evaluation results 19b, and the probability value 20b. In addition, the group of the number of passages 16b and the number of culture days 17b in the data tree 81 includes analysis result 14g, the analysis result 14h, the evaluation result 19a, and the probability value 20d.

That is, by changing the priority of the group division information 15, the analysis result 14, the evaluation result 19, and the probability value 20, which are included in the group of the data tree 81, are changed. Even when the priority of the group division information 15 is changed, the image analysis unit 10a (see FIG. 4) does not analyze the cell image 30 (see FIG. 1) again. In addition, in the example shown in FIG. 11, the lowest layer 81a of the data tree 81 is not displayed, and becomes the display state by the operation input of the user.

Release of Selection of Group Division Information

Next, with reference to FIG. 12, the data tree 82 when the selection of the group division information 15 is released will be described. In the example shown in FIG. 12, the lowest layer 82a of the data tree 82 is not displayed, and becomes the display state by the operation input of the user.

Figure 12:
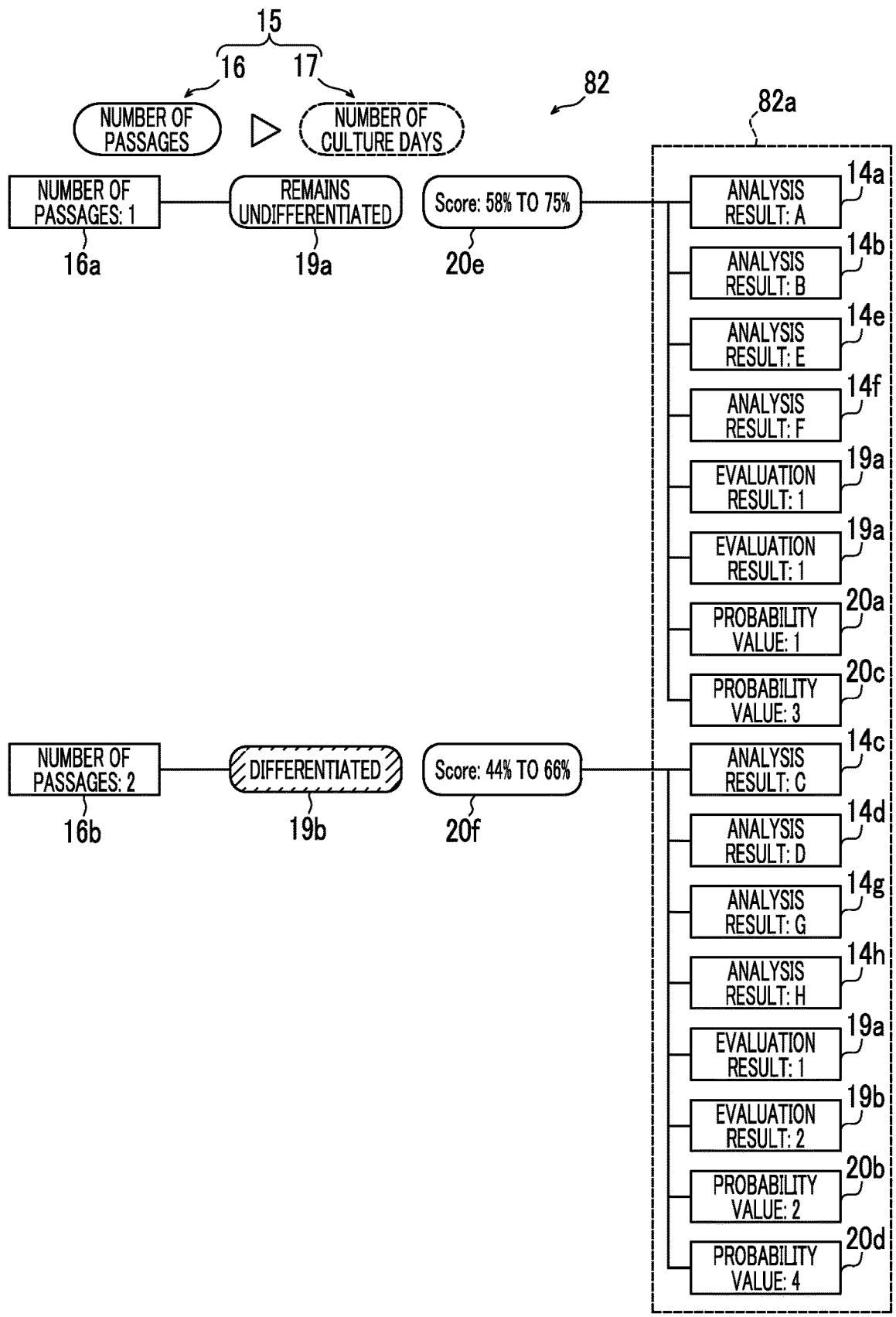
FIG. 12 is a schematic diagram for explaining the data tree when one selection of the group division information is released.

The example shown in FIG. 12 shows the data tree 82 when the selection of the number of culture days 17 is released by the operation input of the user. As shown in FIG. 12, when only one number of passages 16 is selected for the group division information 15, the data tree creating unit 10c creates the data tree 82 obtained by performing group division based on the number of passages 16. Since the group division information 15 is one, the group in which the number of passages 16 is 1 includes the relative data 13 (see FIG. 1) in which the number of culture days 17 is 1 day and the relative data 13 in which the number of culture days 17 is 2 days. That is, the group of the number of passages 16a includes the analysis result 14a, the analysis result 14b, the analysis result 14e, the analysis result 14f, the two evaluation results 19a, the probability value 20a, and the probability value 20c.

In addition, in the group in which the number of passages 16 is 2 includes the relative data 13 in which the number of culture days 17 is 1 day and the relative data 13 in which the number of culture days 17 is 2 days. The group of the number of passages 16b includes the analysis result 14c, the analysis result 14d, the analysis result 14g, the analysis result 14h, the evaluation result 19a, the evaluation result 19b, the probability value 20b, and the probability value 20d. That is, a plurality of probability values 20 exist in each group.

In addition, in the example shown in FIG. 12, all the evaluation results 19 included in the lowest layer 82a of the group of the number of passages 16a are the evaluation results 19a. Therefore, the icon of the evaluation result 19a is displayed in the hierarchy one level above of the lowest layer 82a of the group of the number of passages 16a.

On the other hand, the evaluation results 19 included in the lowest layer 82a of the group of the number of passages 16b are the evaluation result 19a and the evaluation result 19b. In this case, the data tree creating unit 10c acquires the evaluation result 19 to be displayed in the hierarchy one level above the lowest layer 82a of the group of the number of passages 16b, based on a preset condition. In the present embodiment, the data tree creating unit 10c creates the data tree 82 in which the evaluation result 19b is displayed in the hierarchy one level above the lowest layer 82a when the evaluation result 19a that is the evaluation result 19 in which the cell in the cell image 30 remains undifferentiated, and the evaluation result 19b that is the evaluation result 19 in which the cell is differentiated, are included in one hierarchy. When a plurality of types of evaluation results 19 are included in one hierarchy, which evaluation result 19 is to be displayed can be set by the user.

In the present embodiment, as shown in FIG. 12, when a plurality of probability values 20 exist in the hierarchy below the current hierarchy of the data tree 82, the data tree creating unit 10c is configured to create the data tree 82 including the plurality of probability values 20 for being displayed in the current hierarchy of the data tree 82. Specifically, when the plurality of probability values 20 exist in the hierarchy below the current hierarchy of the data tree 82, the data tree creating unit 10c is configured to create the data tree 82 including the minimum value and the maximum value among the plurality of probability values 20 for being displayed in the current hierarchy of the data tree 82.

In the example shown in FIG. 12, the icon 20e of the probability value 20, in which the probability value 20c is the minimum value and the probability value 20a is the maximum value, is displayed in the group of the number of passages 16a. In addition, in the group of the number of passages 16b, the icon 20f of the probability value 20, in which the probability value 20b is the minimum value and the probability value 20d is the maximum value, is displayed.

The display unit 4a (see FIG. 1) is configured to display the data tree 82 displaying the plurality of probability values 20 in the current hierarchy of the data tree 82. The display unit 4a is configured to display the data tree 82 that displays the minimum value and the maximum value of the plurality of probability values 20 in the current hierarchy of the data tree 82.

Figure 13:
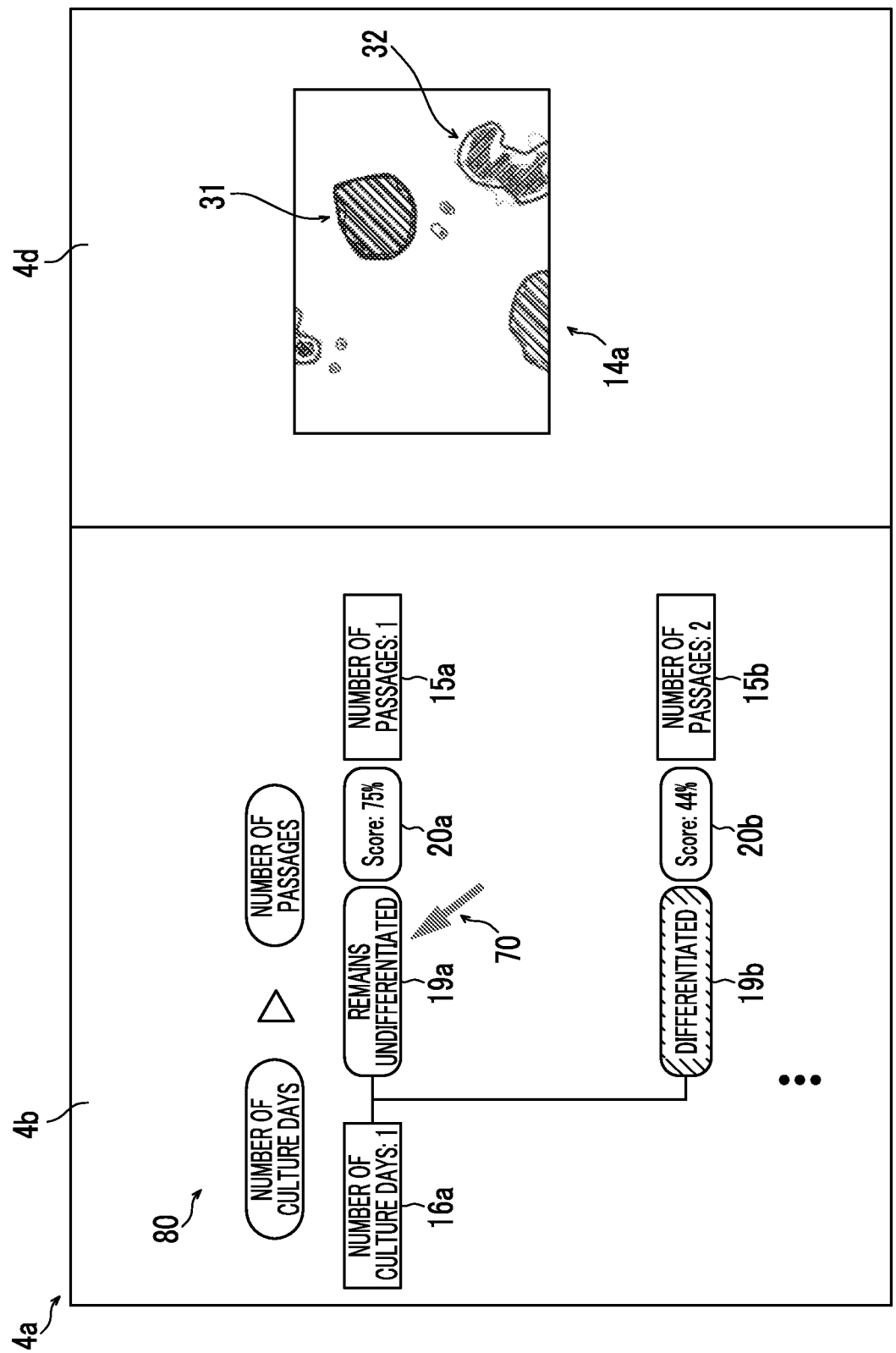
FIG. 13 is a schematic diagram for explaining a configuration in which an analysis result display control unit displays the analysis result when an evaluation result is selected.

Next, a configuration in which the analysis result display control unit 10g (see FIG. 4) performs control to display the corresponding analysis result 14 (see FIG. 1) on the display unit 4a (see FIG. 1) will be explained with reference to FIG. 13. FIG. 13 is an example in which the data tree 80 and the analysis result 14a are displayed on the display unit 4a. The data tree 80 is displayed in the first display area 4b of the display unit 4a, and the analysis result 14a is displayed in a second display area 4d of the display unit 4a. In addition, the analysis result 14a is an image obtained by changing the display modes of an area 31 in which the cell remains undifferentiated and an area 32 in which the cell is differentiated.

When either the evaluation result 19 (see FIG. 1) or the individual information 23 (see FIG. 1) displayed in the data tree 80 (see FIG. 1) is selected, the analysis result display control unit 10g is configured to display the analysis result 14 corresponding to the selected evaluation result 19 in the second display area 4d. The example shown in FIG. 13 is an example when the user selects the evaluation result 19a as indicated by an arrow 70.

The analysis result display control unit 10g acquires the analysis result 14 (the analysis result 14a and the analysis result 14b) corresponding to the evaluation result 19 (evaluation result 19a) selected by the user. Then, the analysis result display control unit 10g performs control to display the acquired analysis result 14 in the second display area 4d. In the example shown in FIG. 13, only the analysis result 14a is shown for convenience out of the analysis result 14a and the analysis result 14b which correspond to the evaluation result 19a.

Figure 14:
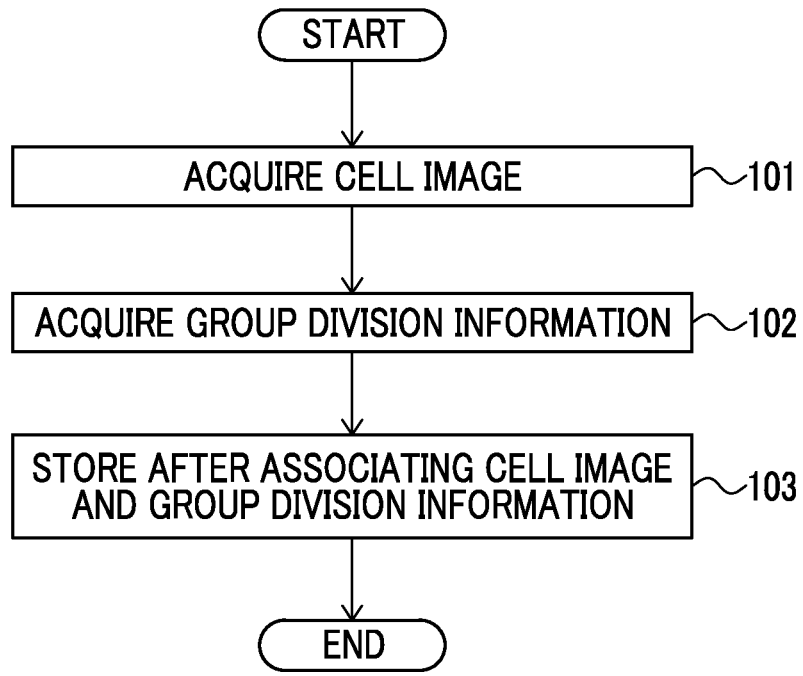
FIG. 14 is a flowchart for explaining a process of registering the group division information by the data processing system according to the embodiment.

Next, with reference to FIG. 14, a configuration in which the group division information setting unit 10b sets the group division information 15 (see FIG. 1) will be described. A process shown in FIG. 14 is started when the input field 40a (see FIG. 5) for the number of passages 16 (see FIG. 1) and the input field 40b (see FIG. 5) for the number of culture days 17 (see FIG. 1) are input, and, further, the registration button 40d (see FIG. 5) is pressed in a state in which the analysis result 14 (see FIG. 1) is selected in the registration data selection field 40c (see FIG. 5).

In step 101, the group division information setting unit 10b acquires the cell image 30 (see FIG. 1). Specifically, the group division information setting unit 10b acquires the cell image 30 selected in the registration data selection field 40c.

In step 102, the group division information setting unit 10b acquires the group division information 15. Specifically, the group division information setting unit 10b acquires the number of passages 16 and the number of culture days 17 from the input field 40a and the input field 40b.

In step 103, the group division information setting unit 10b stores the relative data 13, in which the cell image 30 and the group division information 15 are associated with each other, in the storage unit 11 (see FIG. 1). Specifically, the group division information setting unit 10b stores the relative data 13, in which the cell image 30 is associated with the number of passages 16 and the number of culture days 17, in the storage unit 11. After that, the process ends.

Figure 15:
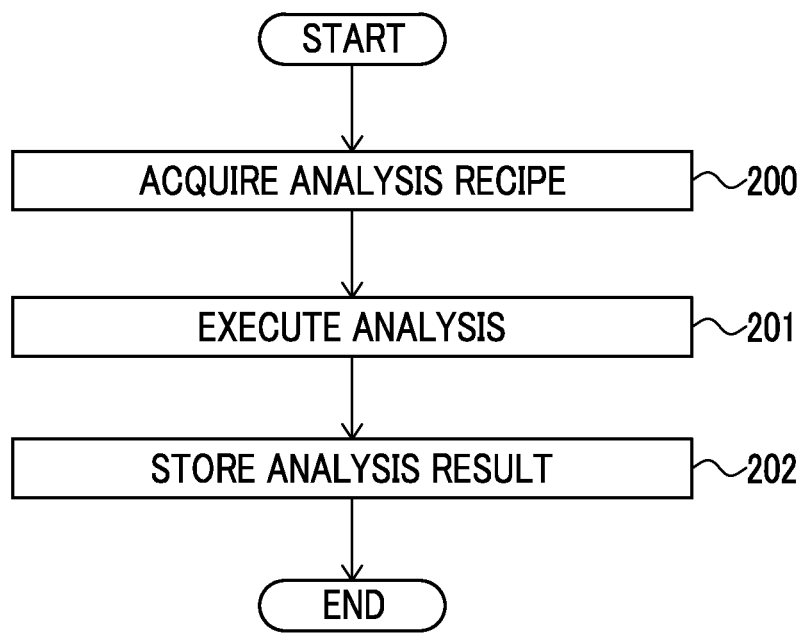
FIG. 15 is a flowchart for explaining a process of analyzing the cell image by the data processing system according to the embodiment.

Next, with reference to FIG. 15, a process of analyzing the cell image 30 (see FIG. 1) by the image analysis unit 10a will be described. The process shown in FIG. 15 is started when an analysis recipe is selected in the analysis recipe selection field 50a (see FIG. 7) and the execution button 50b (see FIG. 7) is pressed.

In step 200, the image analysis unit 10a (see FIG. 4) acquires the analysis recipe. Specifically, the image analysis unit 10a acquires the analysis recipe selected by the analysis recipe selection field 50a.

In step 201, the image analysis unit 10a analyzes the cell image 30. The image analysis unit 10a analyzes the cell image 30 based on the analysis recipe selected in step 200. In the present embodiment, for example, the image analysis unit 10a analyzes whether the cell appearing in the cell image 30 is differentiated or remains undifferentiated.

In step 202, the image analysis unit 10a stores the analysis result 14 (see FIG. 1) in the storage unit 11 (see FIG. 1). Specifically, the image analysis unit 10a stores the cell image 30 in the storage unit 11 in a state in which the analysis result 14, the evaluation result 19 (see FIG. 1), and the probability value 20 (see FIG. 1) are associated. After that, the process ends.

Next, with reference to FIG. 16, a process of creating the data tree 80 by the data tree creating unit 10c and displaying the data tree 80 by the display unit 4a will be described. The process shown in FIG. 16 is started when the user performs an operation input for displaying the data tree 80.

In step 300, the data tree creating unit 10c acquires the relative data 13 from the storage unit 11.

In step 301, the data tree creating unit 10c acquires the priority of the group division information 15 from the storage unit 11. The priority of the group division information 15 is set by the user and stored in the storage unit 11 in advance.

In step 302, the data tree creating unit 10c performs group division on the relative data 13 based on the priority of the group division information 15.

In step 303, the data tree creating unit 10c creates the data tree 80 based on the grouped relative data 13. Then, the data tree creating unit 10c transmits the created data tree 80 to the information display device 4 (see FIG. 1) via the network 90 (see FIG. 1).

In step 304, the information display device 4 displays the data tree 80 on the display unit 4a. After that, the process ends.

When the priority of the group division information 15 is changed, the processes in steps 301 to 304 are executed, and the data tree 80 after the priority is changed is displayed on the display unit 4a.

Effect of Present Embodiment

In the present embodiment, the following effects can be obtained.

In the present embodiment, as described above, the data processing system 100 includes the cell image processing device 1 that analyzes the cell image 30 where the cell appears, and the information display device 4. The cell image processing device 1 includes the image analysis unit 10a that analyzes the acquired cell image 30, the storage unit 11 that stores the relative data 13 in which the cell image 30, the analysis result 14 of the cell image 30, and at least one or more pieces of group division information 15 used to perform group division on the cell image 30 are associated with each other, and the data tree creating unit 10c that creates the virtual data tree 80 including the result information 18 based on the analysis result 14 of the group to be displayed in any hierarchy of the data tree 80 showing a state in which group division is performed so that the plurality of relative data 13 having the common group division information 15 belong to the same group. The information display device 4 includes the display unit 4a that is configured to display the data tree 80 created by the data tree creating unit 10c and displayed with the result information 18 of the group in any hierarchy of the data tree 80.

Therefore, since the data tree creating unit 10c that creates the virtual data tree 80 obtained by performing group division on the relative data 13 is included, a large number of analysis results 14 can be managed without creating a folder group with a hierarchical structure. In addition, since the display unit 4a that displays the data tree 80 displaying the group result information 18 is included in any hierarchy of the data tree 80, the user can confirm the result information 18 on the data tree 80. As a result, the data processing system 100 can be provided that enables easy management of a large number of analysis results 14 on which group division is performed and easy confirmation of the analysis result 14 (result information 18) of the group.

In addition, in the above embodiment, further effects as follows can be obtained by configuring as below.

That is, in the present embodiment, as described above, the group result information 18 includes the evaluation result 19 based on the analysis result 14 included in the group, the data tree creating unit 10c is configured to create the data tree 80 including the evaluation result 19 to be displayed together with the group division information 15 in at least any hierarchy of the data tree 80, and the display unit 4a is configured to display the data tree 80 displaying the evaluation result 19 together with the group division information 15 in at least any hierarchy of the data tree 80. Therefore, the data tree 80 in which the evaluation result 19 is displayed together with the group division information 15 in any hierarchy of the data tree 80 is displayed, so that the user can confirm the evaluation result 19 in the group of the hierarchy in which the evaluation result 19 is displayed for each group division information 15. As a result, it is possible to confirm the evaluation result 19 of the group without individually confirming the analysis result 14 in the group, so that the convenience of the user can be improved.

In addition, in the present embodiment, as described above, the evaluation result 19 is information obtained by determining the type 21 based on the type 21 and the reference which are predetermined by the user. Therefore, it is possible to provide the data processing system 100 suitable for the analysis of the type 21 predetermined by the user and the display of the analysis result 14 in the cell image 30.

In addition, in the present embodiment, as described above, the setting unit 10d that sets the type 21 and the determination reference 22 that is the reference for determining which of the type 21 the analysis result 14 belongs to, and the type classification unit 10f that classifies which type 21 the analysis result 14 is based on the determination reference 22. Therefore, since the setting unit 10d that sets the type 21 and the determination reference 22 is provided, the type 21 and the determination reference 22 can be set according to the analysis of the cell image 30. As a result, the degree of freedom for the analysis of the cell image 30 can be improved. In addition, since the type classification unit 10f is provided that classifies which type 21 the analysis result 14 is, the analysis result 14 can be classified without classifying the analysis result 14 by the user. As a result, the burden of the user can be reduced.

In addition, in the present embodiment, as described above, the input reception unit 5 that receives the operation input of the user is further provided, and the setting unit 10d is configured to set the type 21 and the determination reference 22 based on the operation input which is input via the input reception unit 5. Therefore, the user can set any type 21 and the determination reference 22. As a result, the degree of freedom for the analysis of the cell image 30 can be improved.

In addition, In the present embodiment, as described above, the result information 18 includes analytical numerical data, which is numerical data related to the evaluation result 19, the data tree creating unit 10c is configured to create the data tree 80 including analytical numerical data to be displayed together with the evaluation result 19 in the hierarchy one level above the lowest layer 80a of the data tree 80, and the display unit 4a is configured to display the data tree 80 displaying the analytical numerical data together with the evaluation result 19 in the hierarchy one level above the lowest layer 80a of the data tree 80. Therefore, the user can confirm the evaluation result 19 and the analytical numerical data on the data tree 80 in the group of the hierarchy one level above the lowest layer 80a of the data tree 80 without individually confirming the evaluation result 19 and the analytical numerical data (probability value 20) included in the lowest layer 80a of the data tree 80. As a result, the user can efficiently confirm the evaluation result 19 and the analytical numerical data in the group of the hierarchy one level above the lowest layer 80a of the data tree 80.

In addition, in the present embodiment, as described above, the analytical numerical data includes the probability value 20 indicating which type 21 the analysis result 14 is. Therefore, the data tree 80 in which the probability value 20 is displayed in the data tree 80 can be displayed, the probability value 20 indicating which type 21 the analysis result 14 is. As a result, by confirming the data tree 80, the user can grasp not only the evaluation result 19 but also the probability of the evaluation result 19 from the probability value 20 as the numerical information.

In addition, in the present embodiment, as described above, the data tree creating unit 10c is configured to create the data tree 82 including the plurality of probability values 20 to be displayed in the current hierarchy of the data tree 82 when the plurality of probability values 20 exist in the hierarchy below the current hierarchy of the data tree 82, and the display unit 4a is configured to display the data tree 82 displaying the plurality of probability values 20 in the current hierarchy of the data tree 82. Therefore, the user can confirm the data tree 82 displaying the plurality of probability values 20 together with the evaluation result 19. As a result, the probability of the evaluation result 19 can be grasped in more detail.

In addition, in the present embodiment, as described above, the data tree creating unit 10c is configured to create the data tree 82 including the minimum value and the maximum value among the plurality of probability values 20 to be displayed in the current hierarchy of the data tree 82 when the plurality of probability values 20 exist in the hierarchy below the current hierarchy of the data tree 82, and the display unit 4a is configured to display the data tree 82 displaying the minimum value and the maximum value among the plurality of probability values 20 in the current hierarchy of the data tree 82. Therefore, for example, when the plurality of probability values 20 is three or more, it is possible to suppress the display field of the probability value 20 from becoming large compared to a configuration in which all the probability values 20 are displayed. As a result, it is possible to display the data tree 82 that enables the probability of the evaluation result 19 to be grasped on the data tree 82 while suppressing the display field of the probability value 20 from becoming large.

In addition, in the present embodiment, as described above, the data tree creating unit 10c is configured to create the data tree 80 including the individual information 23, which is information that is capable of specifying the analysis result 14 to be displayed together with the evaluation result 19, in the lowest layer 80a of the data tree 80, and the display unit 4a is configured to display the data tree 80 displaying the individual information 23 together with the evaluation result 19 in the lowest layer 80a of the data tree 80. Therefore, the individual information 23, which is information that is capable of specifying the analysis result 14, is displayed together with the evaluation result 19, so that the user can grasp the evaluation result 19 in a state, in which the analysis result 14 is specified, in the lowest layer 80a of the data tree 80. As a result, the user can grasp the evaluation result 19 of the individual analysis result 14 without individually selecting and displaying the analysis result 14.

In addition, in the present embodiment, as described above, analysis result display control unit 10g is further provided that performs control to display the corresponding analysis result 14 on the display unit 4a when either the evaluation result 19 or the individual information 23 displayed in the data tree 80 is selected. Therefore, the analysis result 14 selected by the user can be displayed together with the data tree 80. As a result, the user can confirm the individual analysis result 14 while managing a large number of analysis result 14 using the data tree 80.

In addition, in the present embodiment, as described above, the priority setting unit 10h that sets the priority of the group division information 15 is further provided, and the data tree creating unit 10c is configured to recreate the data tree 81 based on the priority of the group division information 15 after change when setting of the priority of the group division information 15 is changed. Therefore, the user can change the priority of the group division information 15 to a desired order. As a result, the convenience of the user can be improved.

In addition, in the present embodiment, as described above, the group division information 15 includes at least one of the number of passages 16 of the cell and the number of culture days 17 of the cell. Therefore, it is possible to provide the data processing system 100 suitable for data processing of the analysis in which the analysis result 14 is changed depending on the number of passages 16 of the cell and the number of culture days 17 of the cell.

Modification Example

It should be noted that the embodiments disclosed this time are exemplary in all aspects and are not restrictive. The scope of the present invention is shown by the claims rather than the description of the embodiment described above, and further includes all modifications (modification examples) within the meaning and scope equivalent to the claims.

For example, in the above embodiment, the example is shown in which the type 21 is the information as to whether the cell appearing in the cell image 30 is differentiated or remains undifferentiated, but the present invention is not limited thereto. For example, the type 21 may be information as to whether the cell in the cell image 30 is a normal cell or information as to whether the cell in the cell image 30 is aging. The type 21 may be set according to the class of the learning model when analysis is performed by the image analysis unit 10a.

In addition, in the above embodiment, an example of a configuration is shown in which the processor 10 includes the setting unit 10d and the type classification unit 10f, but the present invention is not limited thereto. For example, the processor 10 may not include the setting unit 10d and the type classification unit 10f.

In addition, in the above embodiment, an example of a configuration is shown in which the data tree creating unit 10c creates data tree 80 (81, 82) in which the evaluation result 19 and the probability value 20 are displayed in the hierarchy one level above the lowest layer 80a (81a, 82a) of the data tree 80 (81, 82). However, the present invention is not limited thereto. For example, the data tree creating unit 10c may be configured to create the data tree 80 (81, 82) in which the evaluation result 19 and the probability value 20 are displayed at the position of the top layer of the data tree 80 (81, 82). The hierarchy in which the evaluation result 19 and the probability value 20 are displayed in the data tree 80 may be any hierarchy other than the lowest layer 80a (81a, 82a).

In addition, in the above embodiment, an example of a configuration is shown in which the data tree creating unit 10c creates data tree 80 (81, 82) in which the evaluation result 19 and the probability value 20 are displayed in the hierarchy one level above the lowest layer 80a (81a, 82a) of the data tree 80 (81, 82). However, the present invention is not limited thereto. For example, the data tree creating unit 10c may be configured to create the data tree 80 (81, 82) in which either the evaluation result 19 or the probability value 20 is displayed at the position of the top layer of the data tree 80 (81, 82).

In addition, in the above embodiment, an example of a configuration is shown in which, when a plurality of probability values 20 are included in the hierarchy below the current hierarchy, the data tree creating unit 10c creates the data tree 80 displaying the plurality of probability values 20 in the current hierarchy. However, the present invention is not limited thereto. For example, the data tree creating unit 10c may be configured to display any of the plurality of probability values 20.

In addition, in the above embodiment, an example of a configuration is shown in which, when the plurality of probability values 20 are included in the hierarchy below the current hierarchy, the data tree creating unit 10c creates the data tree 80 in which the minimum value and the maximum value of the plurality of probability values 20 are displayed in the current hierarchy. However, the present invention is not limited thereto. For example, the data tree creating unit 10c may be configured to create the data tree 80 in which all of the plurality of probability values 20 are displayed.

In addition, in the above embodiment, an example of a configuration in which the data tree creating unit 10c creates the data tree 80 (81, 82) in which the individual information 23 is displayed together with the evaluation result 19 in the lowest layer 80a (81a, 82a) of the data tree 80 (81, 82). However, the present invention is not limited thereto. For example, the data tree creating unit 10c may be configured to create the data tree 80 (81, 82) in which the individual information 23 is not displayed together with the evaluation result 19 in the lowest layer 80a (81a, 82a) of the data tree 80 (81, 82).

In addition, in the above embodiment, an example of a configuration is shown in which the processor 10 includes the priority setting unit 10h. However, the present invention is not limited thereto. For example, the processor 10 may not include the priority setting unit 10h.

In addition, in the above embodiment, an example is shown in which the group division information 15 includes the number of passages 16 and the number of culture days 17. However, the present invention is not limited thereto. For example, the group division information 15 may include, in addition to the number of passages 16 and the number of culture days 17, the type of culture solution for culturing the cell, the type of coating agent coated on the bottom surface of a culture vessel for culturing cell, and the like.

In addition, in the above embodiment, an example of a configuration is shown in which the individual information 23 is the file name 25 of the analysis result 14. However, the present invention is not limited thereto. For example, the individual information 23 may be the icon 26 of the analysis result 14.

In addition, in the above embodiment, an example of a configuration is shown in which the cell image processing device 1 analyzes whether the cell appearing in the cell image 30 is differentiated or remains undifferentiated. However, the present invention is not limited thereto. For example, the cell image processing device 1 may analyze whether or not the cell in the cell image 30 is the normal cell, or may analyze whether or not the cell in the cell image 30 is aging.

In the above embodiment, an example is shown in which the data processing system 100 is constructed in a client-server model. However, the present invention is not limited thereto. For example, the data processing system 100 may be configured by an independent computer.

Aspects

It will be understood by those skilled in the art that the above-described exemplary embodiments are specific examples of the following embodiments.

Item 1

A data processing system includes
a cell image processing device that analyzes a cell image where a cell appears; and
an information display device, in which
the cell image processing device includes
an image analysis unit that analyzes the acquired cell image,
a storage unit that stores relative data in which the cell image, an analysis result of the cell image, and at least one or more pieces of group division information used to perform group division on the cell image are associated with each other, and a data tree creating unit that creates a virtual data tree including result information based on the analysis result of a group to be displayed in any hierarchy of the data tree showing a state in which group division is performed so that a plurality of the relative data having the common group division information belong to the same group, and the information display device includes a display unit that is configured to display the data tree which is created by the data tree creating unit and displayed with the result information of the group in any hierarchy of the data tree.

Item 2

In the data processing system according to item 1, the result information of the group includes an evaluation result based on the analysis result included in the group, the data tree creating unit is configured to create the data tree including the evaluation result to be displayed together with the group division information in at least any hierarchy of the data tree, and the display unit is configured to display the data tree in which the evaluation result is displayed together with the group division information in at least any hierarchy of the data tree.

Item 3

In the data processing system according to item 2, the evaluation result is information, based on a type and a reference which are predetermined by a user, obtained by determining the type.

Item 4

The data processing system according to item 3, further includes a setting unit that sets the type and a determination reference that is the reference for determining which of the type the analysis result belongs to; and a type classification unit that classifies which type the analysis result is based on the determination reference.

Item 5

The data processing system according to item 4 further includes an input reception unit that receives an operation input of the user, in which the setting unit is configured to set the type and the determination reference based on the operation input which is input via the input reception unit.

Item 6

In the data processing system according to item 4 or 5, the result information includes analytical numerical data which is numerical data related to the evaluation result, the data tree creating unit is configured to create the data tree including the analytical numerical data to be displayed together with the evaluation result in a hierarchy one level above a lowest layer of the data tree, and the display unit is configured to display the data tree displaying the analytical numerical data together with the evaluation result in the hierarchy one level above the lowest layer of the data tree.

Item 7

In the data processing system according to item 6, the analytical numerical data includes a probability value indicating which type the analysis result is.

Item 8

In the data processing system according to item 7, the data tree creating unit is configured to create the data tree including a plurality of the probability values to be displayed in a current hierarchy of the data tree when the plurality of the probability values exist in a hierarchy below the current hierarchy of the data tree, and the display unit is configured to display the data tree displaying the plurality of the probability values in the current hierarchy of the data tree.

Item 9

In the data processing system according to item 8, the data tree creating unit is configured to create the data tree including a minimum value and a maximum value among the plurality of the probability values to be displayed in the current hierarchy of the data tree when the plurality of the probability values exist in the hierarchy below the current hierarchy of the data tree, and the display unit is configured to display the data tree displaying the minimum value and the maximum value among the plurality of the probability values in the current hierarchy of the data tree.

Item 10

In the data processing system according to any one of items 2 to 9, the data tree creating unit is configured to create the data tree including individual information, which is information that is capable of specifying the analysis result to be displayed together with the evaluation result, in a lowest layer of the data tree, and the display unit is configured to display the data tree displaying the individual information together with the evaluation result in the lowest layer of the data tree.

Item 11

The data processing system according to item 10 further includes an analysis result display control unit that performs control to display the corresponding analysis result on the display unit when either the evaluation result or the individual information displayed in the data tree is selected.

Item 12

The data processing system according to any one of items 1 to 11, further includes a priority setting unit that sets a priority of the group division information, in which the data tree creating unit is configured to recreate the data tree based on a changed priority of the group division information when setting of the priority of the group division information is changed.

Item 13

In the data processing system according to any one of items 1 to 12, the group division information includes at least one of the number of passages of the cell and the number of culture days of the cell.

What is claimed is:

1. A data processing system comprising:
a cell image processing device that analyzes a cell image where a cell appears; and
an information display device, wherein
the cell image processing device includes
an image analysis unit that analyzes the cell image,
a storage unit that stores relative data in which the cell image, an analysis result of the cell image, and at least one or more pieces of group division information used to perform group division on the cell image are associated with each other, and a data tree creating unit that creates a virtual data tree including result information based on the analysis result of a group to be displayed in any hierarchy of the data tree showing a state in which group division is performed so that a plurality of the relative data having a common group division information belong to a same group, and the information display device includes a display unit that is configured to display the data tree which is created by the data tree creating unit and displayed with the result information of the group in any hierarchy of the data tree.

2. The data processing system according to claim 1, wherein the result information of the group includes an evaluation result based on the analysis result included in the group, the data tree creating unit is configured to create the data tree including the evaluation result to be displayed together with the group division information in at least any hierarchy of the data tree, and the display unit is configured to display the data tree in which the evaluation result is displayed together with the group division information in at least any hierarchy of the data tree.

3. The data processing system according to claim 2, wherein the evaluation result is information, based on a type and a reference which are predetermined by a user, obtained by determining the type.

4. The data processing system according to claim 3, further comprising:

a setting unit that sets the type and a determination reference that is the reference for determining which of the type the analysis result belongs to; and a type classification unit that classifies which type the analysis result is based on the determination reference.

5. The data processing system according to claim 4, further comprising:

an input reception unit that receives an operation input of the user, wherein the setting unit is configured to set the type and the determination reference based on the operation input which is input via the input reception unit.

6. The data processing system according to claim 4, wherein the result information includes analytical numerical data which is numerical data related to the evaluation result, the data tree creating unit is configured to create the data tree including the analytical numerical data to be displayed together with the evaluation result in a hierarchy one level above a lowest layer of the data tree, and the display unit is configured to display the data tree displaying the analytical numerical data together with the evaluation result in the hierarchy one level above the lowest layer of the data tree.

7. The data processing system according to claim 6, wherein the analytical numerical data includes a probability value indicating which type the analysis result is.

8. The data processing system according to claim 7, wherein the data tree creating unit is configured to create the data tree including a plurality of the probability values to be displayed in a current hierarchy of the data tree when the plurality of the probability values exist in a hierarchy below the current hierarchy of the data tree, and the display unit is configured to display the data tree displaying the plurality of the probability values in the current hierarchy of the data tree.

9. The data processing system according to claim 8, wherein the data tree creating unit is configured to create the data tree including a minimum value and a maximum value among the plurality of the probability values to be displayed in the current hierarchy of the data tree when the plurality of the probability values exist in the hierarchy below the current hierarchy of the data tree, and the display unit is configured to display the data tree displaying the minimum value and the maximum value among the plurality of the probability values in the current hierarchy of the data tree.

10. The data processing system according to claim 2, wherein the data tree creating unit is configured to create the data tree including individual information, which is information that is capable of specifying the analysis result to be displayed together with the evaluation result, in a lowest layer of the data tree, and the display unit is configured to display the data tree displaying the individual information together with the evaluation result in the lowest layer of the data tree.

11. The data processing system according to claim 10, further comprising:

an analysis result display control unit that performs control to display the corresponding analysis result on the display unit when either the evaluation result or the individual information displayed in the data tree is selected.

12. The data processing system according to claim 1, further comprising:

a priority setting unit that sets a priority of the group division information, wherein the data tree creating unit is configured to recreate the data tree based on a changed priority of the group division information when setting of the priority of the group division information is changed.

13. The data processing system according to claim 1, wherein the group division information includes at least one of a number of passages of the cell and a number of culture days of the cell.

* * * * *